United States Patent
Tamura

(10) Patent No.: US 7,737,826 B2
(45) Date of Patent: Jun. 15, 2010

(54) EVENT NOTIFICATION DEVICE, EVENT NOTIFICATION METHOD, AND COMPUTER PROGRAM PRODUCT

(75) Inventor: Hiroshi Tamura, Kanagawa (JP)

(73) Assignee: Ricoh Company Ltd., Tokyo (JP)

( * ) Notice: Subject to any disclaimer, the term of this patent is extended or adjusted under 35 U.S.C. 154(b) by 344 days.

(21) Appl. No.: 11/900,293

(22) Filed: Sep. 10, 2007

(65) Prior Publication Data

US 2008/0061960 A1 Mar. 13, 2008

(30) Foreign Application Priority Data

Sep. 12, 2006 (JP) .............................. 2006-246580
Jul. 25, 2007 (JP) .............................. 2007-192943

(51) Int. Cl.
*G08B 9/00* (2006.01)
*G06F 3/00* (2006.01)
*G06F 11/00* (2006.01)

(52) U.S. Cl. ........................ 340/286.02; 710/19; 714/48

(58) Field of Classification Search ......... 370/242–245; 340/286.02; 710/26, 27; 719/313; 714/48
See application file for complete search history.

(56) References Cited

U.S. PATENT DOCUMENTS

| | | | | |
|---|---|---|---|---|
| 6,775,238 B1 * | 8/2004 | Suzuki | ........................ | 370/242 |
| 7,236,835 B2 * | 6/2007 | Tanimoto | ...................... | 700/21 |
| 7,355,758 B2 * | 4/2008 | Desai | .......................... | 358/400 |
| 7,389,448 B2 * | 6/2008 | Sakai | ........................... | 714/48 |
| 7,474,623 B2 * | 1/2009 | Boyd et al. | .................. | 370/242 |
| 7,551,303 B2 * | 6/2009 | Hikawa et al. | ............. | 358/1.15 |
| 7,581,145 B2 * | 8/2009 | Nagamine | ..................... | 714/48 |
| 7,603,590 B2 * | 10/2009 | Kaneda | ......................... | 714/48 |
| 2004/0080776 A1 * | 4/2004 | Garcia | ......................... | 358/1.14 |
| 2004/0263897 A1 * | 12/2004 | Shimada et al. | ............. | 358/1.14 |
| 2005/0062997 A1 * | 3/2005 | Hasegawa et al. | .......... | 358/1.13 |
| 2005/0248801 A1 * | 11/2005 | Miyahara et al. | ........... | 358/1.14 |
| 2006/0123266 A1 * | 6/2006 | Matsumoto | ..................... | 714/1 |
| 2007/0016911 A1 * | 1/2007 | Cyktor et al. | ................ | 719/313 |
| 2007/0047454 A1 * | 3/2007 | Fujii | .......................... | 370/245 |
| 2007/0058552 A1 * | 3/2007 | Miyoshi | ..................... | 370/242 |
| 2007/0168046 A1 * | 7/2007 | Misawa et al. | .................. | 700/1 |
| 2009/0049452 A1 * | 2/2009 | Kriegel et al. | ................ | 719/313 |

FOREIGN PATENT DOCUMENTS

| | | |
|---|---|---|
| JP | 2001-282471 | 10/2001 |
| JP | 2005-4326 | 1/2005 |
| JP | 2005-84891 | 3/2005 |
| JP | 2006-72568 | 3/2006 |

* cited by examiner

*Primary Examiner*—Jennifer Mehmood
(74) *Attorney, Agent, or Firm*—Cooper & Dunham LLP

(57) ABSTRACT

An event notification device notifies an event occurring in it to a plurality of client devices via a network. A receiving unit receives a request from a client device indicating an event to be monitored. An adding unit adds information about the client device from where the request is received and the event mentioned in the request, an event monitoring unit monitors events occurring in the event notification device based on setting information, and an event notifying unit notifies to the client device from where the request is received that the event mentioned in the request has occurred when the event mentioned in the request occurs.

19 Claims, 28 Drawing Sheets

FIG. 5

```
<s12:Envelope
    xmlns:s12='http://www.w3.org/2003/05/soap-envelope'
    xmlns:wsa='http://schemas.xmlsoap.org/ws/2004/08/addressing'
    xmlns:wse='http://schemas.xmlsoap.org/ws/2004/08/eventing' >
  <s12:Header>
    <wsa:Action>
        http://schemas.xmlsoap.org/ws/2004/08/eventing/Subscribe
    </wsa:Action>
    <wsa:MessageID>
        uuid:e1886c5c-5e86-48d1-8c77-fc1c28d47180
    </wsa:MessageID>
    <wsa:ReplyTo>
      <wsa:Address>http://www.example.com/MyEvEntsink</wsa:Address>
    </wsa:ReplyTo>
    <wsa:To>http://www.example.org/mfp-check/EventSource</wsa:To>
  </s12:Header>
  <s12:Body>
    <wse:Subscribe>
      <wse:EndTo>
        <wsa:Address>
          http://www.example.com/MyEventSink
        </wsa:Address>
      </wse:EndTo>
      <wse:Delivery>
        <wse:NotifyTo>
          <wsa:Address>
            http://www.example.com/MyEventSink
          </wsa:Address>
        </wse:NotifyTo>
      </wse:Delivery>
      <wse:Expires>2006-06-26T21:07:00.000-08:00</wse:Expires>
      <wse:Filter xmlns:mfp='http://www.example.org/mfp'
          Dialect='http://www.example.org/mfp-check/StatusEvent' >
      </wse:Filter>                                                  ~-501
    </wse:Subscribe>
  </s12:Body>
</s12:Envelope>
```

FIG. 6

```
<s12:Envelope
    xmlns:s12='http://www.w3.org/2003/05/soap-envelope'
    xmlns:wsa='http://schemas.xmlsoap.org/ws/2004/08/addressing'
    xmlns:wse='http://schemas.xmlsoap.org/ws/2004/08/eventing' >
  <s12:Header>
    <wsa:Action>
      http://schemas.xmlsoap.org/ws/2004/08/eventing/SubscribeResponse
    </wsa:Action>
    <wsa:RelatesTo>
        uuid:e1886c5c-5e86-48d1-8c77-fc1c28d47180
    </wsa:RelatesTo>
    <wsa:To>http://www.example.com/MyEventSink</wsa:To>
  </s12:Header>
  <s12:Body>
    <wse:SubscribeResponse>
      <wse:SubscriptionManager>
        <wsa:Address>
          http://www.example.org/mfp-check/SubscriptionManager
        </wsa:Address>
        <wsa:ReferenceParameters>
          <wse:Identifier>
            uuid:22e8a584-0d18-4228-b2a8-3716fa2097fa
          </wse:Identifier>
        </wsa:ReferenceParameters>
      </wse:SubscriptionManager>
      <wse:Expires>2006-07-01T00:00:00.000-00:00</wse:Expires>   ~-601
    </wse:SubscribeResponse>
  </s12:Body>
</s12:Envelope>
```

FIG. 7

```
<s12:Envelope
    xmlns:s12='http://www.w3.org/2003/05/soap-envelope'
    xmlns:wsa='http://schemas.xmlsoap.org/ws/2004/08/addressing'
    xmlns:wse='http://schemas.xmlsoap.org/ws/2004/08/eventing' >
  <s12:Header>
    <wsa:Action>
      http://schemas.xmlsoap.org/ws/2004/08/eventing/Renew
    </wsa:Action>
    <wsa:MessageID>
        uuid:bd88b3df-5db4-4392-9621-aee9160721f6
    </wsa:MessageID>
    <wsa:ReplyTo>
      <wsa:Address>http://www.example.com/MyEventSink</wsa:Address>
    </wsa:ReplyTo>
    <wsa:To>
        http://www.example.org/mfp-check/SubscriptionManager
    </wsa:To>
    <wse:Identifier>
        uuid:22e8a584-0d18-4228-b2a8-3716fa2097fa
    </wse:Identifier>
  </s12:Header>
  <s12:Body>
    <wse:Renew>
      <wse:Expires>2006-06-26T21:07:00.000-08:00</wse:Expires>
    </wse:Renew>
  </s12:Body>
</s12:Envelope>
```

FIG. 8

```
<s12:Envelope
    xmlns:s12='http://www.w3.org/2003/05/soap-envelope'
    xmlns:wsa='http://schemas.xmlsoap.org/ws/2004/08/addressing'
    xmlns:wse='http://schemas.xmlsoap.org/ws/2004/08/eventing' >
  <s12:Header>
    <wsa:Action>
      http://schemas.xmlsoap.org/ws/2004/08/eventing/RenewResponse
    </wsa:Action>
    <wsa:RelatesTo>
        uuid:bd88b3df-5db4-4392-9621-aee9160721f6
    </wsa:RelatesTo>
    <wsa:To>http://www.example.com/MyEventSink</wsa:To>
  </s12:Header>
  <s12:Body>
    <wse:RenewResponse>
      <wse:Expires>2006-07-26T12:00:00.000-00:00</wse:Expires>
    </wse:RenewResponse>
  </s12:Body>
</s12:Envelope>
```

FIG. 9

```
<s12:Envelope
    xmlns:s12='http://www.w3.org/2003/05/soap-envelope'
    xmlns:wsa='http://schemas.xmlsoap.org/ws/2004/08/addressing'
    xmlns:wse='http://schemas.xmlsoap.org/ws/2004/08/eventing' >
  <s12:Header>
    <wsa:Action>
     http://schemas.xmlsoap.org/ws/2004/08/eventing/SubscriptionEnd
    </wsa:Action>
    <wsa:To>http://www.example.com/MyEventSink</wsa:To>
  </s12:Header>
  <s12:Body>
    <wse:SubscriptionEnd>
      <wse:SubscriptionManager>
        <wsa:Address>
          http://www.example.org/mfp-check/SubscriptionManager
        </wsa:Address>
        <wsa:ReferenceParametres>
          <wse:Identifier>
            uuid:22e8a584-0d18-4228-b2a8-3716fa2097fa
          </wse:Identifier>
        </wsa:ReferenceParameters>
      </wse:SubscriptionManager>
      <wse:Code>wse:SourceCanceling</wse:Code>
      <wse:Reason xml:lang='en-US' >
       Event source cannot continue keep your subscription.
      </wse:Reason>
    </wse:SubscriptionEnd>
  </s12:Body>
</s12:Envelope>
```

FIG. 10

```
<s12:Envelope
    xmlns:s12='http://www.w3.org/2003/05/soap-envelope'
    xmlns:wsa='http://schemas.xmlsoap.org/ws/2004/08/addressing'
    xmlns:mfp='http://www.example.org/mfp' >
  <s12:Header>
    <wsa:Action>
        http://www.example.org/mfp-check/StatusEventReport
    </wsa:Action>
    <wsa:MessageID>
        uuid:568b4ff2-5bc1-4512-957c-0fa545fd8d7f
    </wsa:MessageID>
    <wsa:To>http://www.example.com/MyEventSink</wsa:To>
  </s12:Header>
  <s12:Body>
    <mfp:StatusEventReport>
      <mfp:Date>20060630</mfp:Date>
      <mfp:Time>1158</mfp:Time>
      <mfp:State>Out of Toner</mfp:State>
      <mfp:Comments xml:lang='en-US' >
          Please clear this status.
      </mfp:Comments>
    </mfp:StatusEventReport>
  </s12:Body>
</s12:Envelope>
```

FIG. 11A

```
<S:Envelope>
 <S:Header>
  <wsa:Action>
   http://schemas.xmlsoap.org/ws/2004/08/addressing/fault
  </wsa:Action>
  <!-- Headers elided for clarity. -->
 </S:Header>
 <S:Body>
  <S:Fault>
   <S:Code>
    <S:Value>s12:Receiver</S:Value>
    <S:Subcode>
     <S:Value>wse:EventSourceUnableToProcess</S:Value>
    </S:Subcode>
   </S:Code>
   <S:Reason>
    <S:Text xml:lang="en">CannotSubscribe because of not-enough resource</S:Text>
   </S:Reason>
   <S:Detail>
   </S:Detail>
  </S:Fault>
 </S:Body>
</S:Envelope>
```

FIG. 11B

```
<S:Envelope>
 <S:Header>
  <wsa:Action>
   http://schemas.xmlsoap.org/ws/2004/08/addressing/fault
  </wsa:Action>
  <!-- Headers elided for clarity. -->
 </S:Header>
 <S:Body>
  <S:Fault>
   <S:Code>
    <S:Value>s12:Receiver</S:Value>
    <S:Subcode>
     <S:Value>wse:UnableToRenew</S:Value>
    </S:Subcode>
   </S:Code>
   <S:Reason>
    <S:Text xml:lang="en">CannotRenew because of not-enough resource</S:Text>
   </S:Reason>
   <S:Detail>
   </S:Detail>
  </S:Fault>
 </S:Body>
</S:Envelope>
```

| EVENT TYPE | NOTIFICATION DESTINATION CLIENT | VALIDITY PERIOD |
|---|---|---|
| SERVICE CALL | 192. 168. 1. 5 | 2006/7/1 0:00 |
| FEED ERROR | 192. 168. 3. 24 | 2006/7/1 1:01 |
| ⋮ | ⋮ | ⋮ |

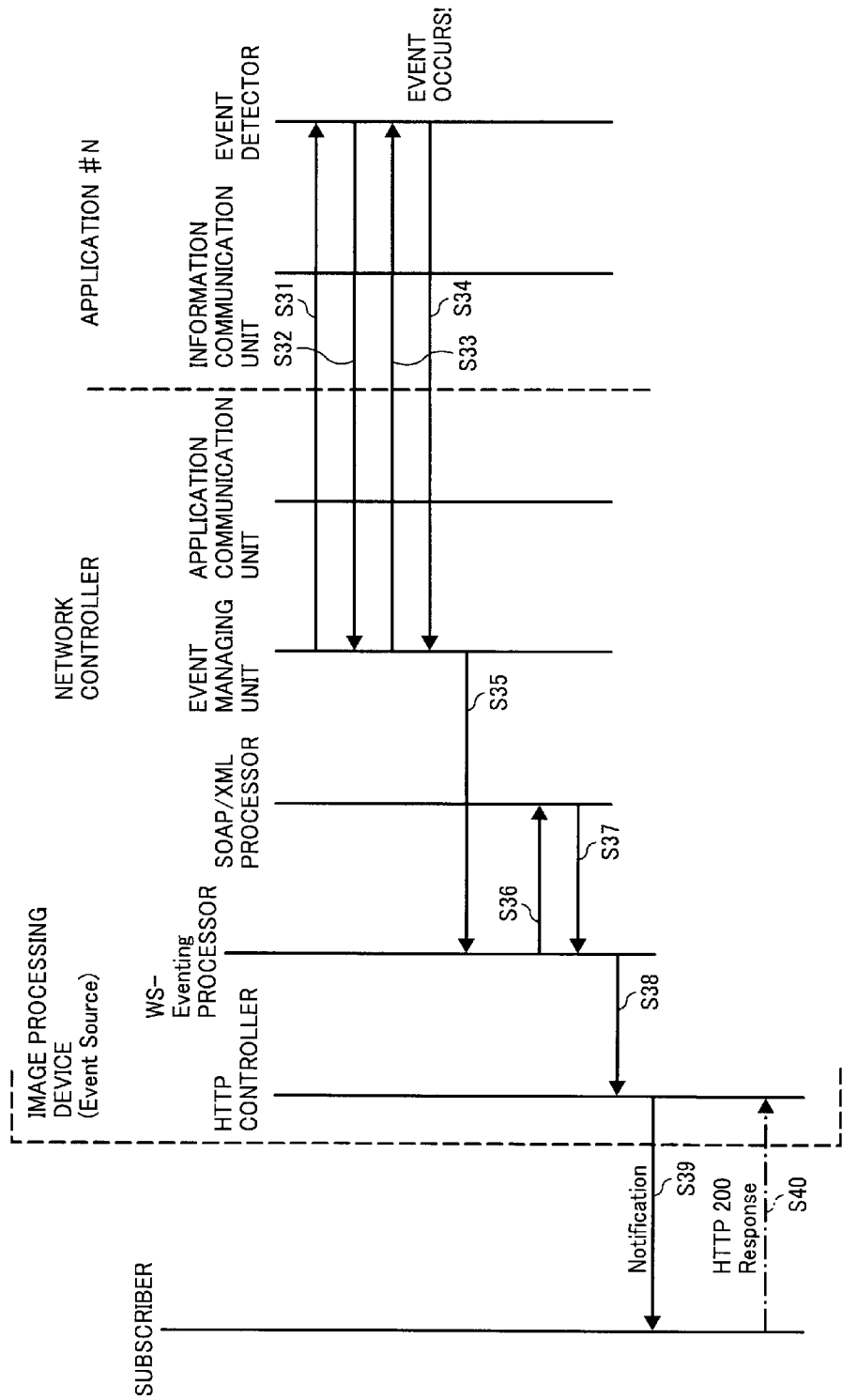

FIG. 15A

| ID | NUMBER OF SUBSCRIBE REGISTRATIONS | POLLING INTERVAL |
|---|---|---|
| 1 | EQUAL TO OR LESS THAN 100 | 1 SECOND |
| 2 | BETWEEN 101 AND 200 | 2 SECONDS |
| 3 | BETWEEN 201 AND 300 | 3 SECONDS |
| 4 | MORE THAN 300 | 5 SECONDS |

FIG. 15B

| ID | TYPE OF NOTIFICATION EVENT | POLLING INTERVAL |
|---|---|---|
| 1 | SERVICE CALL | 1 SECOND |
| 2 | NO TONER | 1 SECOND |
| 3 | LOW TONER | 2 SECONDS |
| 4 | NO PAPER | 1 SECOND |
| 5 | FEW PAPER | 2 SECONDS |

FIG. 18A

| ID | IP ADDRESS | PRIORITY |
|---|---|---|
| 1 | 192. 168. 1. 5 | HIGH |
| 2 | 192. 168. 2. 24 | MIDDLE |
| 3 | 192. 168. 3. 24 | LOW |
| 4 | 192. 168. 1. 6 | LOW |

FIG. 18B

| ID | EVENT | PRIORITY |
|---|---|---|
| 1 | SERVICE CALL | HIGH |
| 2 | OFF LINE | MIDDLE |
| 3 | DOOR OPEN | MIDDLE |
| 4 | COVER OPEN | HIGH |
| 5 | FEED ERROR | MIDDLE |
| 6 | LAMP ERROR | MIDDLE |
| 7 | ALL TONERS/NO INK | HIGH |
| 8 | Z-COLOR TONER/NO INK | MIDDLE |
| 9 | Z-COLOR TONER/LOW INK | LOW |
| 10 | NO PAPER | HIGH |
| 11 | NO Y-SIZE PAPER | MIDDLE |
| 12 | FEW Y-SIZE PAPER | LOW |
| 13 | ALL DISCHARGE PAPER TRAYS FULL | HIGH |
| 14 | X-DISCHARGE PAPER TRAY FULL | MIDDLE |
| 15 | X-DISCHARGE PAPER TRAY ALMOST FULL | LOW |
| 16 | ALL Storages FULL | MIDDLE |
| 17 | W-Storage FULL | LOW |
| 18 | W-Storage ALMOST FULL | LOW |
| 19 | CHARGE AMOUNT EXCEEDS PREDETERMINED VALUE | LOW |
| 20 | | |

| ID | NUMBER OF SUBSCRIBE (EVENT) REGISTRATIONS | RESPONSE WAITING TIME |
|---|---|---|
| 1 | EQUAL TO OR LESS THAN 100 | 4 SECONDS |
| 2 | BETWEEN 101 AND 200 | 3 SECONDS |
| 3 | BETWEEN 201 AND 300 | 2 SECONDS |
| 4 | MORE THAN 300 | 1 SECOND |

FIG. 24

| MANAGEMENT NUMBER | NOTIFICATION DESTINATION CLIENT | EVENT TYPE | Subscribe ID | VALIDITY TIME | REGISTRATION TIME |
|---|---|---|---|---|---|
| 1 | 192.168.1.5 | PrinterStatus | uuid:f34d5678...... | 40 MINUTES | 2/07/13:00 |
| 2 | 192.168.1.5 | MachineStatus | uuid:01234567...... | 20 MINUTES | 2/07/13:11 |
| 3 | 192.168.1.5 | MachineConfiguration | uuid:98765432...... | 40 MINUTES | 2/07/13:11 |
| 4 | 192.168.1.5 | PrinterJobStatus | uuid:adbdf983...... | 10 MINUTES | 2/07/13:12 |
| 5 | 192.168.1.3 | PrinterStatus | uuid:1234abcd...... | 10 MINUTES | 2/07/13:12 |
| 6 | 192.168.1.3 | MachineStatus | uuid:deac7654...... | 40 MINUTES | 2/07/13:12 |
| 7 | 192.168.1.3 | MachineConfiguration | uuid:66665555...... | 30 MINUTES | 2/07/13:14 |
| 8 | 192.168.1.3 | PrinterJobStatus | uuid:2a3d4c6b...... | 10 MINUTES | 2/07/13:15 |
| 9 | fe08::214:51ff:fe22:3344 | ScannerStatus | uuid:a1b4d7c0...... | 40 MINUTES | 2/07/13:15 |
| 10 | fe08::214:51ff:fe22:3344 | PrinterStatus | uuid:eeffbb33...... | 30 MINUTES | 2/07/13:17 |
| 11 | fe08::214:51ff:fe22:3344 | MachineStatus | uuid:9988aa66...... | 20 MINUTES | 2/07/13:18 |
| 12 | fe08::214:51ff:fe22:3344 | MachineConfiguration | uuid:cc5566dd...... | 60 MINUTES | 2/07/13:19 |
| 13 | fe08::214:51ff:fe22:3344 | ScannerJobStatus | uuid:11223344...... | 40 MINUTES | 2/07/13:19 |
| 14 | fe08::214:51ff:fe22:3344 | PrinterJobStatus | uuid:eedfacb...... | 20 MINUTES | 2/07/13:20 |

FIG. 25

| NUMBER OF MONITORING EVENTS | VALIDITY TIME |
|---|---|
| BETWEEN 1 AND 50 | TIME REQUESTED FROM MONITORING DESTINATION |
| BETWEEN 51 AND 100 | 30 MINUTES |
| BETWEEN 101 AND 200 | 20 MINUTES |
| MORE THAN 201 | 10 MINUTES |
| NO ASSIGNMENT OF VALIDITY TIME | 10 MINUTES |

FIG. 26

```
<s12:Envelope
    xmlns:s12='http://www.w3.org/2003/05/soap-envelope'
    xmlns:wsa='http://schemas.xmlsoap.org/ws/2004/08/addressing'
    xmlns:wse='http://schemas.xmlsoap.org/ws/2004/08/eventing' >
  <s12:Header>
    <wsa:Action>
        http://schemas.xmlsoap.org/ws/2004/08/eventing/Subscribe         -3001
    </wsa:Action>
    <wsa:MessageID>
        uuid:e1886c5c-5e86-48d1-8c77-fc1c28d47180
    </wsa:MessageID>
    <wsa:ReplyTo>
      <wsa:Address>http://www.example.com/MyEvEntsink</wsa:Address>
    </wsa:ReplyTo>
    <wsa:To>http://www.example.org/mfp-check/EventSource</wsa:To>
  </s12:Header>
  <s12:Body>
    <wse:Subscribe>
      <wse:EndTo>
        <wsa:Address>
          http://www.example.com/MyEventSink
        </wsa:Address>
      </wse:EndTo>
      <wse:Delivery>
        <wse:NotifyTo>
          <wsa:Address>
            http://www.example.com/MyEventSink
          </wsa:Address>
        </wse:NotifyTo>
      </wse:Delivery>                           -3002
      <wse:Expires>PT30M</wse:Expires>
      <wse:Filter xmlns:mfp='http://www.example.org/mfp'            -3003
          Dialect='http://www.example.org/mfp-check/PrinterStatusEvent'>
      </wse:Filter>
    </wse:Subscribe>
  </s12:Body>
</s12:Envelope>
```

FIG. 27

```
<s12:Envelope
    xmlns:s12='http://www.w3.org/2003/05/soap-envelope'
    xmlns:wsa='http://schemas.xmlsoap.org/ws/2004/08/addressing'
    xmlns:wse='http://schemas.xmlsoap.org/ws/2004/08/eventing' >
  <s12:Header>
    <wsa:Action>
      http://schemas.xmlsoap.org/ws/2004/08/eventing/SubscribeResponse        /-3101
    </wsa:Action>
    <wsa:RelatesTo>
        uuid:e1886c5c-5e86-48d1-8c77-fc1c28d47180
    </wsa:RelatesTo>
    <wsa:To>http://www.example.com/MyEventSink</wsa:To>
  </s12:Header>
  <s12:Body>
    <wse:SubscribeResponse>
      <wse:SubscriptionManager>
        <wsa:Address>
          http://www.example.org/mfp-check/SubscriptionManager
        </wsa:Address>
        <wsa:ReferenceParameters>
          <wse:Identifier>
            uuid:22e8a584-0d18-4228-b2a8-3716fa2097fa
          </wse:Identifier>
        </wsa:ReferenceParameters>
      </wse:SubscriptionManager>
      <wse:Expires>PT30M</wse:Expires>    /-3012
    </wse:SubscribeResponse>
  </s12:Body>
</s12:Envelope>
```

FIG. 28

```
<s12:Envelope
    xmlns:s12='http://www.w3.org/2003/05/soap-envelope'
    xmlns:wsa='http://schemas.xmlsoap.org/ws/2004/08/addressing'
    xmlns:wse='http://schemas.xmlsoap.org/ws/2004/08/eventing' >
  <s12:Header>
    <wsa:Action>
      http://schemas.xmlsoap.org/ws/2004/08/eventing/SubscribeResponse     ⌐3201
    </wsa:Action>
    <wsa:RelatesTo>
      uuid:e1886c5c-5e86-48d1-8c77-fc1c28d47180
    </wsa:RelatesTo>
    <wsa:To>http://www.example.com/MyEventSink</wsa:To>
  </s12:Header>
  <s12:Body>
    <wse:SubscribeResponse>
      <wse:SubscriptionManager>
        <wsa:Address>
          http://www.example.org/mfp-check/SubscriptionManager
        </wsa:Address>
        <wsa:ReferenceParameters>
          <wse:Identifier>
            uuid:22e8a584-0d18-4228-b2a8-3716fa2097fa
          </wse:Identifier>
        </wsa:ReferenceParameters>
      </wse:SubscriptionManager>
      <wse:Expires>PT10M</wse:Expires>     ⌐3202
    </wse:SubscribeResponse>
  </s12:Body>
</s12:Envelope>
```

| EVENT TYPE | VALIDITY TIME |
|---|---|
| PrinterStatus | 30 MINUTES |
| ScannerStatus | 30 MINUTES |
| MachineStatus | 20 MINUTES |
| PrinterJobStatus | 10 MINUTES |
| ScannerJobStatus | 10 MINUTES |
| MachineConfiguration | 10 MINUTES |

| IP ADDRESS | VALIDITY TIME |
|---|---|
| 192.168.1.5 | 30 MINUTES |
| 192.168.2/24 | 20 MINUTES |
| fe08::214:51ff:fe22:3344 | 30 MINUTES |
| 2023:0246:4adf/48 | 10 MINUTES |

FIG. 32

```
<s:Envelope
 xmlns:a="http://schemas.xmlsoap.org/ws/2004/08/addressing"
 xmlns:d="http://schemas.xmlsoap.org/ws/2005/04/discovery"
 xmlns:s="http://www.w3.org/2003/05/soap-envelope">
<s:Header>
<a:Action>
http://schemas.xmlsoap.org/ws/2005/04/discovery/Bye       -3701
</a:Action>
<a:MessageID>
uuid:337497fa-3b10-43a5-95c2-186461d72c9e
</a:MessageID>
<a:To>urn:schemas-xmlsoap-org:ws:2005:04:discovery</a:To>
<d:AppSequence InstanceId="1077004800" MessageNumber="4"/>
</s:Header>
<s:Body>
<d:Bye>
<a:EndpointReference>
<a:Address>
uuid:98190dc2-0890-4ef8-ac9a-5940995e6119
</a:Address>
</a:EndpointReference>
</d:Bye>
</s:Body>
</s:Envelope>
```

FIG. 33

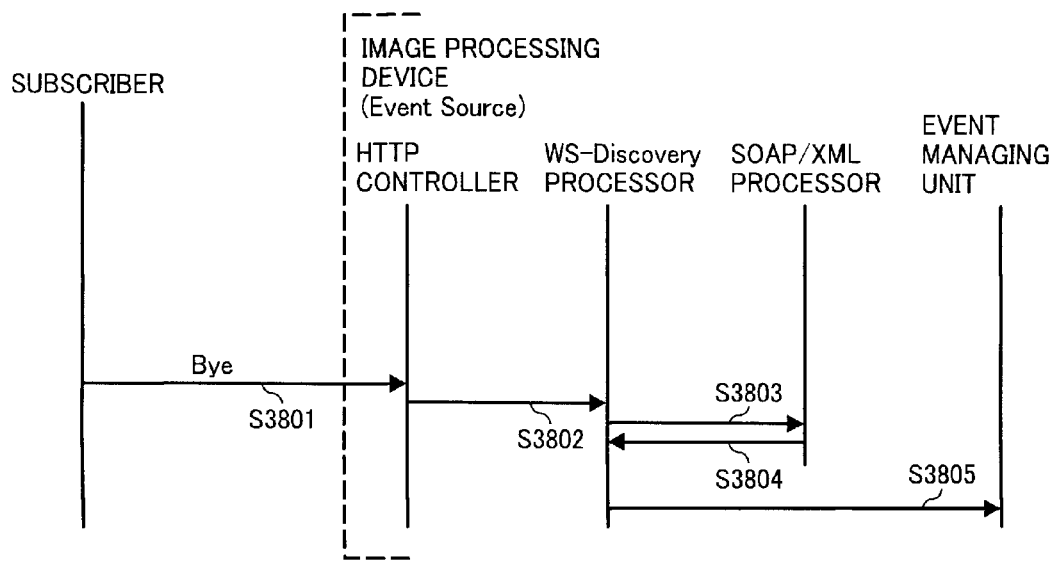

EVENT NOTIFICATION DEVICE, EVENT NOTIFICATION METHOD, AND COMPUTER PROGRAM PRODUCT

CROSS-REFERENCE TO RELATED APPLICATIONS

The present application claims priority to and incorporates by reference the entire contents of Japanese priority documents, 2006-246580 filed in Japan on Sep. 12, 2006 and 2007-192943 filed in Japan on Jul. 25, 2007.

BACKGROUND

1. Technical Field

This disclosure relates to a technology for notifying information about an event occurring in one device to other devices.

2. Description of the Related Art

Network image processing devices, such as printers, are known in the art that can receive operation instructions from other devices (users) via a network, such as the Internet or Intranet. When an event occurs in such an image processing device, it notifies information about the event to all of its users. As a result, the users can grasp the content of the event and execute appropriate operations. Such events generally relate to the hardware or software conditions in the image processing device.

When notifying information about an event to the users, the information is simultaneously sent to all the users. Because the information is simultaneously sent to all the users, traffic on the network temporarily suddenly increases, resulting in the decrease of the response speed. Japanese Patent Application Laid-open No. 2001-282471 teaches to provide a delay, if the number of the users is large, in sending the information to some of the users. With this arrangement, a rapid increase in the traffic is prevented, and a reduction in the response speed is avoided.

In the technique disclosed in Japanese Patent Application Laid-open No. 2001-282471 there exists a problem that the occurrence of the event cannot be notified to all users.

For example, consider that the image processing device monitors events at 2-second intervals, and a first even occurs at a certain time and a second event occurs 2 seconds after the first even. In this case, there can be some users who do not receive the information about the first event although the second event has already occurred. In other words, there arises inconsistency that some users receive the information about the first event after the occurrence of the second event. Consequently, the user can get confused. That is, the event occurrence information can be correctly notified to all users in the case of an example shown in FIG. 34A. The event occurrence information cannot be correctly notified in the case of an example shown in FIG. 34B, and a user who cannot receive the notification within 2 seconds will receive a notification of old information.

As another example, because of a long validity period of requesting an event notification to plural devices, the number of users who request the notification becomes large, and this has a risk of generating a delay in the notification process.

BRIEF SUMMARY

According to an aspect of this disclosure, there is provided an event notification device connected to a plurality of client devices via a network that includes a receiving unit that receives from at least a first client device from among the client devices a request message containing a request for monitoring a first event from among a plurality of events that could occur in the event notification device; an adding unit that adds information about the first client device as destination client information and information about the first event as the monitoring-target event information to a storage unit; a setting unit that sets setting information to be used when monitoring events occurring in the event notification device based on at least one of the destination client information and the monitoring-target event information stored in the storage unit; an event monitoring unit that monitors events, including the first event, occurring in the event notification device based on the setting information; and an event notifying unit that notifies, when the event monitoring unit detects occurrence of the first event, to the first client device based on the destination device information and the monitoring-target event information stored in the storage unit.

According to another aspect of this disclosure, there is provided a method of notifying an event occurring on a source device to a plurality of client devices connected to the source device via a network including receiving from at least a first client device from among the client devices a request message containing a request for monitoring a first event from among a plurality of events that could occur in the source device; adding information about the first client device as destination client information and information about the first event as the monitoring-target event information to a storage unit; setting information to be used when monitoring events occurring in the event notification device based on at least one of the destination client information and the monitoring-target event information stored in the storage unit; monitoring events, including the first event, occurring in the event notification device based on the setting information; and notifying, when the event monitoring unit detects occurrence of the first event, to the first client device based on the destination device information and the monitoring-target event information stored in the storage unit.

According to another aspect of this disclosure, there is provided a computer program product that includes a computer-readable recording medium that stores therein a computer program that causes a computer to execute the above method.

The above-mentioned and other aspects, features, advantages and technical and industrial significance will be better understood by reading the following detailed description of presently preferred embodiments of the invention, when considered in connection with the accompanying drawings.

BRIEF DESCRIPTION OF THE DRAWINGS

FIG. 5 is one example of a Subscribe message;

FIG. 6 is one example of a SubscribeResponse message;

FIG. 7 is one example of a Renew message;

FIG. 8 is one example of a RenewResponse message;

FIG. 9 is one example of a SubscriptionEnd message;

FIG. 10 is one example of a StatusEventReport message;

FIGS. 11A and 11B are examples of fault messages;

FIG. 14 is an example of a sequence of an event-occurrence monitoring operation and an event notification operation;

FIGS. 15A and 15B depict examples of contents of information that the image processing device shown in FIG. 1 uses during the event-occurrence monitoring operation;

FIGS. 18A and 18B depict examples of contents of information that the image processing device shown in FIG. 1 uses when receiving a Subscribe message and a Renew message;

FIG. 24 depicts an example of contents of event management information shown in FIG. 23;

FIG. 25 depicts an example of contents of validity-time management information shown in FIG. 23;

FIG. 26 is one example of a Subscribe message in a WS-Eventing protocol;

FIG. 27 is a first example of a SubscribeResponse message according to the second embodiment;

FIG. 28 is a second example of the SubscribeResponse message according to the second embodiment;

FIG. 32 is one example of the network withdrawn packet;

FIG. 33 is a sequence diagram that the image processing device according to the second embodiment receives the network withdrawn packet.

DETAILED DESCRIPTION OF THE PREFERRED EMBODIMENTS

Exemplary embodiments of an event notification device according to the present invention suitable for an image processing device including a copy function, a facsimile (FAX) function, a print function, a scanner function, and a distribution function of an input image (a document image read by the scanner function and an image input by the FAX function) will be explained below in detail with reference to the accompanying drawings.

Figure 1:
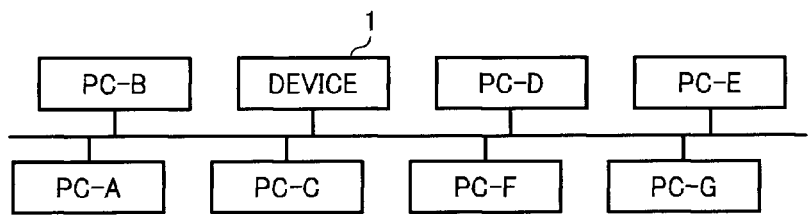
FIG. 1 is one example of a system including an image processing device and devices that use the image processing device via a network according to a first embodiment of the present invention.

FIG. 1 is one example of a system including an image processing device and terminals that use the image processing device via a network according to a first embodiment of the present invention. This system includes a "device" corresponding to the above image processing device, and plural personal computers (PC-A, PC-B, PC-C, PC-D, PC-E, PC-F, PC-G) that use the device. While a personal computer usually needs to execute a predetermined procedure to use an image processing device 1 via a network, it is assumed that each of these personal computers has already executed the necessary procedure and is in the state of being able to use the image processing device 1. Not only the personal computers but also terminals having a similar communication function can also use the image processing device 1. The terminals that use the above image processing device 1 via the network are hereinafter called clients.

Figure 2:
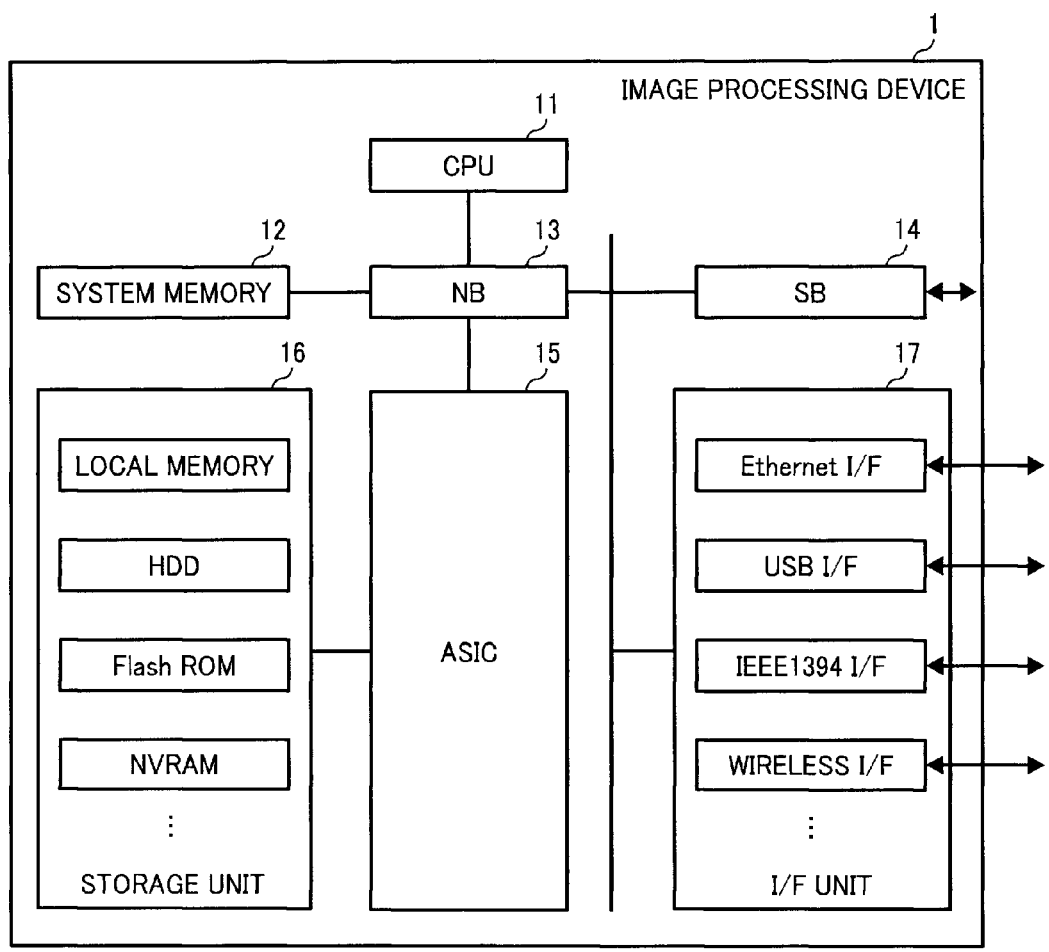
FIG. 2 is an example of a hardware configuration of the image processing device shown in FIG. 1.

As shown in FIG. 2, the image processing device 1 includes a central processing unit (CPU) 11, a system memory 12, a north bridge (NB) 13, a south bridge (SB) 14, an application-specific integrated circuit (ASIC) 15, a storage unit 16, and an interface (I/F) unit 17.

The CPU 11 controls the image processing device 1. The system memory 12 is used to carry out a drawing process. The NB 13 is used to connect between the CPU 11, the system memory 12, the SB 14, the ASIC 15, and the I/F unit 17. The SB 14 is used to connect between the constituent elements shown in FIG. 2 and other constituent elements (such as a read only memory (ROM)) not shown in the drawing. The ASIC 15 is an integrated circuit (IC) for image processing having a hardware element for image processing. The storage unit 16 includes a local memory, a hard disk drive (HDD), a flash ROM, and a nonvolatile random-access memory (NVRAM), and is used as a storage area of image data and an operation area for image processing. The I/F unit 17 includes an Ethernet™ I/F, a universal serial bus (USB) I/F, an Institute of Electrical and Electronics Engineers (IEEE) 1394 I/F, and a wireless I/F. These interfaces are used for connection to networks such as the Internet and the Intranet and for connection to personal computers.

Figure 3:
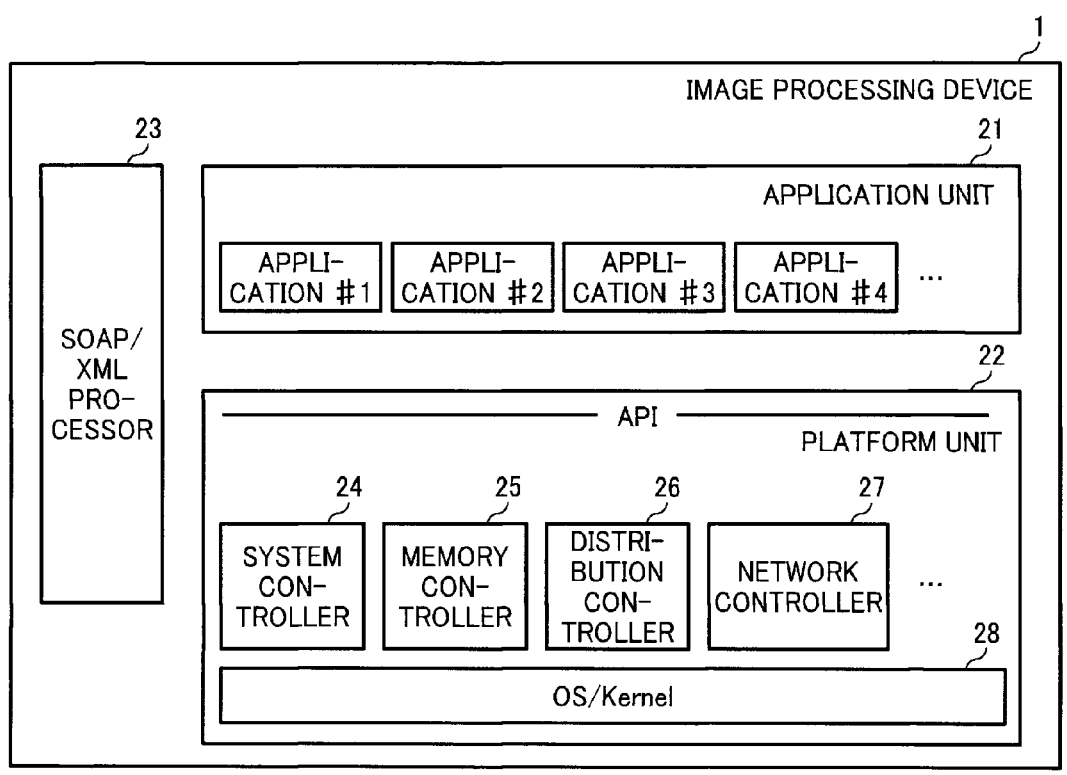
FIG. 3 is an example of a software configuration of the image processing device shown in FIG. 1.

FIG. 3 is an exemplary software configuration of the image processing device 1. An application unit 21, a platform unit 22, and a Simple Object Access Protocol (SOAP)/Extensible Markup Language (XML) processor 23 constitute software. The CPU 11 shown in FIG. 2 controls these constituent elements. The application unit 21 includes plural application processors (application #1, application #2, application #3, application #4, . . . ) that execute processes specific to user services relevant to the image forming process carried out by the printer and the copying machine. The platform unit 22 includes an operating system (OS)/Kernel 28, and various controllers (a system controller 24, a memory controller 25, a distribution controller 26, a network controller 27, . . . ) that interpret processing requests from the application unit 21 and generate requests for acquiring various kinds of resources such as hardware. The platform unit 22 also has an application program interface (API) that makes it possible to receive the processing requests from the application unit 21 using functions defined in advance.

The system controller 24 carries out application management and hardware resource management. The memory controller 25 carries out memory control such as obtaining and release of memories. The distribution controller 26 carries out management of data and process of data to transmit and receive data to and from other devices. The network controller 27 is connected to the network interface such as the Ethernet I/F shown in FIG. 1, provides services that can be used in common to applications requiring network input/output (I/O), allocates data received from the network by each protocol to each application, and mediates the transmission of data from each application to the network. A socket and a network processor are present in the OS/Kernel 28.

The SOAP/XML processor 23 is present in a state of being able to be used by the application unit and the platform unit. The SOAP/XML processor 23 encodes/decodes SOAP/XML messages. The SOAL/XML processor 23 is usually provided in the format of a library, and can be also provided in the format of a process.

Figure 4:
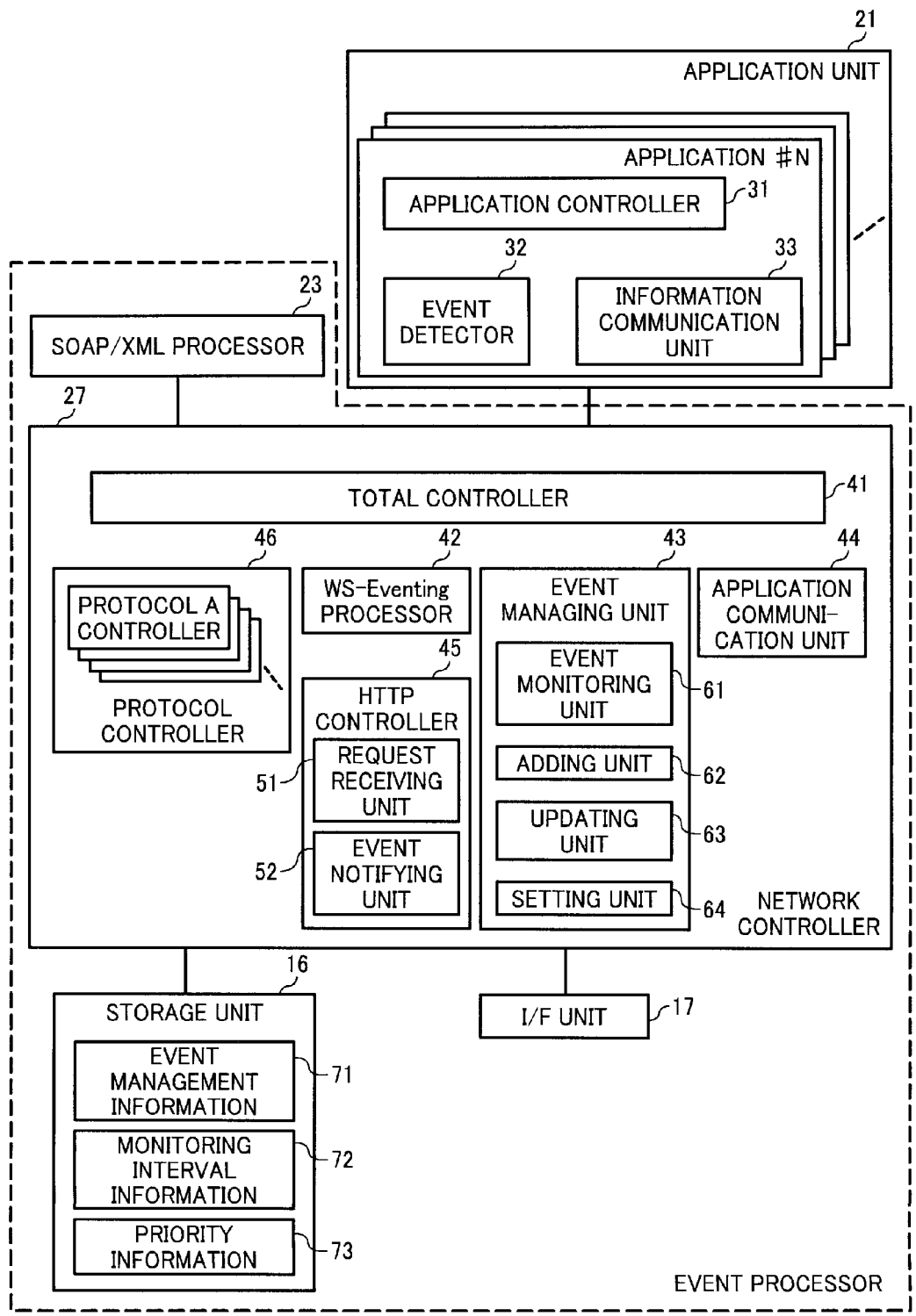
FIG. 4 is a configuration example of an event notifying unit and an application unit that achieve a characteristic process of the image processing device shown in FIG. 1.

FIG. 4 is an exemplary detailed functional configuration of an event processor that achieves a characteristic process of the image processing device 1, and an exemplary detailed configuration of the application unit 21 shown in FIG. 3. The event processor includes the network controller 27 included in the platform unit 22 and the SOAP/XML processor 23 shown in FIG. 3, and the storage unit 16 and the I/F unit 17 shown in FIG. 2.

The network controller 27 includes a total controller 41 that controls the total, a WS-Eventing processor 42 that process the WS-Eventing protocol, an event managing unit 43 that manages events, an application communication unit 44 that exchanges various kinds of information (messages and data) with the application unit 21 shown in FIG. 3, a HyperText Transport Protocol (HTTP) controller 45, and a protocol controller 46 that processes various kinds of protocols (for example, the file transfer protocol (FTP), the Port9100, the Line Printer Daemon protocol (LPR)) other than the HTTP.

The HTTP controller 45 includes a request receiving unit 51, and an event notifying unit 52, and exchanges data, using the HTTP protocol. The request receiving unit 51 receives an event monitoring request from the client. The request receiving unit 51 then registers the received event monitoring request into event management information 71.

When the event managing unit 43 detects an event, the event notifying unit 52 notifies the event to a transmission destination, using the HTTP protocol.

The event managing unit 43 includes an event monitoring unit 61, an adding unit 62, an updating unit 63, and a setting unit 64. The event monitoring unit 61 monitors whether an event occurs in each application of the application unit 21, via the application communication unit 44.

When the request receiving unit 51 receives an event monitoring request, the adding unit 62 adds an event name included in the event monitoring request, a client name of the transmitter of the event monitoring request, and a validity period to the event management information 71 described later, by relating these items to each other. The client of the transmitter is added as a client of the event notification destination. The event name indicates a type of the event that occurs. A method of obtaining the validity period is described later. The updating unit 63 updates the event management information.

The setting unit 64 sets setting information that the event monitoring unit 61 monitor controls, based on at least one of the client of the event notification destination and the event name stored in the event management information 71. In the first embodiment, a case that the setting unit 64 sets an event monitoring cycle as the setting information is explained.

The storage unit 16 includes the event management information 71, monitoring interval information 72, and priority information 73.

Each application processor (the application #1, ...) included in the application unit 21 has a similar configuration, and includes an application controller 31 that controls the application processor, an event detector 32 that detects an event, and an information communication unit 33 that exchanges various kinds of information (messages and data) with each controller (each controller included in the event processor) constituting the platform unit shown in FIG. 3.

The event processor periodically monitors whether an event has occurred in each application processor (the application #1, ...) of the application unit 21. When the event occurrence in any one application processor is detected, the event processor notifies this fact to each client. Details of the monitoring operation about whether an event has occurred and details of the event-content notification operation to each client at the event occurrence time are described later.

A detailed operation of the image processing device 1 is explained below, focusing on the operation of the event processor. First, initialization of the image processing device 1 that the client carries out to receive notification of the content of an event when it occurs from the image processing device 1 is explained. Specifically, the client requests the image processing device 1 to notify the client about the event that occurs, and the image processing device 1 executes an operation in response to this request. This operation is explained below.

An example of the use of the WS-Eventing protocol is explained below. First, the client transmits a message of the content shown in FIG. 5 to the image processing device 1. FIG. 5 is one example of a Subscribe message. The client requests the image processing device 1 to notify the client about the content of the event instructed in this message when this event occurs. The content of this message indicates "the client wishes to be notified when the status of the event shown by "StatusEvent (reference numeral 501) has changed (when the event has occurred)". When the image processing device 1 receives the Subscribe message, the image processing device 1 confirms whether the device can respond to this request content, and transmits a response message of the content based on a confirmation result.

The image processing device 1, receives the Subscribe message, and transmits a message of the content as shown in FIG. 6 to the client. FIG. 6 is one example of a response (SubscribeResponse) message in response to the Subscribe message, indicating that the Subscribe message has been normally accepted. The content of this message indicates "when the event instructed in the Subscribe message has occurred (has been detected), this content (the occurred event) is notified until when the validity period shown in the Expires field 601 expires". Thereafter, in principle, when the image processing device 1 detects the event instructed in the Subscribed message, the image processing device 1 continues notifying the content to the client of the transmission destination of the SubscribeResponse message, until when the validity period shown in the Expires field expires.

The client receives the SubscribeResponse message. When the client wishes to continuously receive the notification after the expiration of the validity period shown in the received message, the client transmits a message of the content as shown in FIG. 7 to the image processing device 1. FIG. 7 is one example of a Renew message. Usually, the client transmits this message in the state of receiving the event notification from the image processing device 1. The content of this message indicates "the client wishes to receive the notification of the event that occurs, continuously even after the expiration of the validity period (shown in the Expires field included in the SubscribeResponse message received earlier)".

Upon receiving the Renew message, the image processing device 1 transmits a message of the content as shown in FIG. 8 to the client. FIG. 8 is one example of a response (RenewResponse) message in response to the Renew message, indicating that the Renew message has been normally accepted. This content indicates "the event that occurs (detected) is notified until when the validity period shown in the Expires field expires". That is, the updated validity period is shown in the Expires field.

FIG. 9 is one example of a SubscriptionEnd message. The image processing device 1 transmits such a SubscriptionEnd message to a client to whom the notification of events ends, when the event notification is to be stopped despite the validity period shown in the Expires field.

FIG. 10 is one example of a StatusEventReport message. The image processing device 1 notifies events that occurred by the expiration of the validity period notified in the SubscribeResponse message and the RenewResponse message, to the client of the transmission destination of these messages, using the StatusEventReport message. FIG. 10 depicts a message to notify that the toner is out, when the image processing device 1 has detected the out of toner.

FIGS. 11A and 11B are examples of response messages to the Subscribe message (see FIG. 5) and the Renew message (see FIG. 7), respectively. These are examples of fault messages that the image processing device 1 returns to the client when the requests (Subscribe, Renew) cannot be accepted. When the image processing device 1 cannot accept the Subscribe message or the Renew message despite the reception of this message, the image processing device 1 transmits the fault message in place of the SubscribeResponse message or the Renew message. FIGS. 11A and 11B also depict the messages to be returned to the client when the image processing device 1 cannot accept the requests (Subscribe or Renew), due to the shortage of a resource (not-enough resource).

Figures 12, 13:
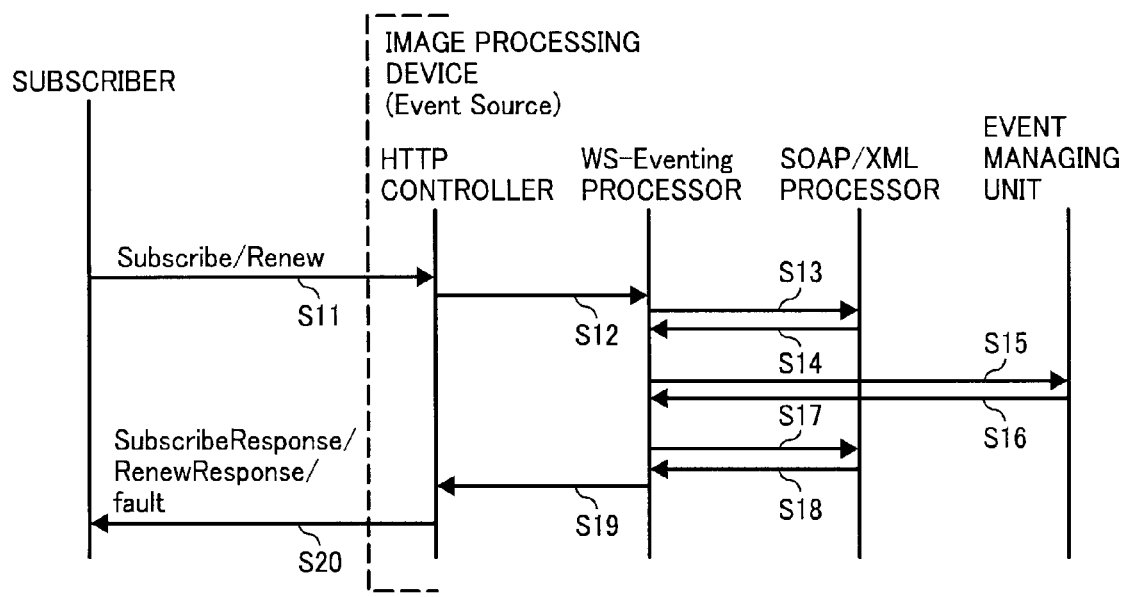
FIG. 12 is an example of a sequence that the image processing device shown in FIG. 1 receives the Subscribe message or the Renew message.
FIG. 13 depicts an example of contents of event management information shown in FIG. 4.

FIG. 12 is an example of a sequence that the image processing device 1 receives the Subscribe message or the Renew message from the client. The "subscriber" is the client.

When the image processing device 1 receives the Subscribe message or the Renew message from the client (step S11), the request receiving unit 51 of the HTTP controller 45 delivers the received message to the WS-Eventing processor 42 in the network controller of the image processing device 1 (step S12). The WS-Eventing processor 42 then delivers that message to the SOAP/XML processor 23 (step S13). The SOAP/XML processor 23 analyzes the content of the message. The SOAP/XML processor 23 returns a result of analysis to the WS-Eventing processor 42 (step S14).

The WS-Eventing processor 42 requests the event managing unit 43 to register the content-analysis result received at step S14 (step S15), and the event managing unit 43 executes the process based on the request content at step S15.

For example, when the request receiving unit 51 receives the Subscribe message and when the event managing unit 43 determines that the request in the message can be accepted, the adding unit 62 of the event managing unit 43 adds a new record to the event management information 71, based on the content of the Subscribe message. This event management information 71 indicates to which client an event that occurs should be notified, and indicates a correspondence relationship between each event and the client of the notification destination. The event management information 71 also includes validity period information of the event notification operation (information indicating by when which notification is to be notified to which client).

FIG. 13 depicts the contents of the event management information 71 in a tabular form. As shown in FIG. 13, the event management information 71 includes event name, notification destination client, and validity period. That is, when the event managing unit determines that an optional event has occurred, the event notifying unit 52 notifies a message indicating the occurred event to the client at the notification destination related to the event name indicating the event, when the validity period has not expired.

When the request receiving unit 51 receives the Renew message and also when the event managing unit 43 determines that the request in the message can be accepted, the updating unit 63 updates the validity period of the event notification operation included in the event management information 71, that is, updates the event management information 71. The event management information 71 updated based on the reception of the Subscribe message or the Renew message is held in the storage unit 16 or the like. When the request indicating the Subscribe message or the Renew message cannot be accepted, the event management information 71 is not updated.

When the process ends, the event managing unit 43 notifies a result of the processing to the WS-Eventing processor 42 (step S16). The WS-Eventing processor 42 requests the SOAP/XML processor 23 to generate, based on the processing result notification received at step S16, a message (a response message) to be transmitted to the client as the transmitter of the Subscribe message or the Renew message (step S17). The SOAP/XML processor 23 generates a response message following the content of the request from the WS-Eventing processor 42, and delivers the generated message to the WS-Eventing processor 42 (step S18). The WS-Eventing processor 42 receives the response message at step S18, and delivers the response message to the HTTP controller 45 (step S19). The HTTP controller 45 transmits the received response message to the client (step S20).

The content of the message transmitted from the HTTP controller 45 at step S20 differs depending on the content of the message (the Subscribe message or the Renew message) that the image processing device receives at step S11 and a result of the processing carried out by the event managing unit 43 at step S16. When the image processing device 1 accepts the content (request) indicated in the message received at step S1, the HTTP controller 45 transmits the SubscribeResponse message (see FIG. 6) or the RenewResponse message (see FIG. 8). On the other hand, when the image processing device 1 does not accept the request, the HTTP controller 45 transmits the fault message (see FIGS. 11A and 11B).

FIG. 14 is one example of an event-occurrence monitoring sequence and a notification operation sequence of a detected event carried out by the image processing device 1.

In the image processing device 1, the event monitoring unit 61 of the event managing unit 43 of the network controller periodically monitors whether an event has occurred in each application processor of the application unit 21 (steps S31 and S33). Specifically, the event monitoring unit 61 enquires the event detector 32 of each application processor about whether an event has occurred (whether the state has changed), via the application communication unit 44.

In the example shown in FIG. 14, while the event managing unit 43 enquires the event detector 32 of only one application processor (the application #N) to simplify the explanation, the event managing unit 43 actually enquires all the application processors. Further, the event managing unit 43 and the event detector 32 of each application processor communicate with each other via the application communication unit 44 and the information communication unit 33.

When the event monitoring unit 61 of the event managing unit 43 periodically monitors the occurrence of an event in each application processor, the setting unit 64 of the event managing unit 43 sets the monitoring cycle according to the number of clients to whom the monitoring result is to be notified.

FIGS. 15A and 15B are examples of structures of the monitoring interval information 72. For example, the monitoring interval information 72 as shown in FIG. 15A is prepared in advance. The setting unit 64 confirms the number of subscribe-registered clients (the number of clients to whom the occurrence of an event is to be notified) to whom the monitoring result is to be notified from the event management information 71. As a result of the confirmation, when the number of clients is equal to or less than 100 (when the number of subscribe-registered clients is equal to or smaller than 100), the setting unit 64 sets a monitoring cycle (a polling interval) of the occurrence of intervals to 1 second, and when the number of clients is between 101 and 200, the setting unit 64 sets the monitoring cycle to 2 seconds. The monitoring cycle in the monitoring interval information 72 in FIG. 15A is determined based on time required to carry out a monitoring-result notification process to one client. With this arrangement, a detected event can be correctly notified to all Subscribe-registered clients.

Some events that occur in the image processing device 1 require a prompt and accurate notification of the content, and other events do not require a prompt and accurate notification of the content. For example, among events concerning toner, detection of a complete out of toner is frequently required. On the other hand, detection of a reduction of the toner is not frequently required. There are few problems when a reduction of the toner is not immediately and correctly notified to the client (when a state of the reduction of the toner is not notified immediately). Therefore, the event monitoring cycle can be differentiated for each application, instead of setting monitoring cycles of all events constant.

As a modification of the first embodiment, instead of the monitoring interval information 72 shown in FIG. 15A, a monitoring interval information as shown in FIG. 15B is prepared in advance, and is stored in the storage unit 16. The setting unit 64 sets the monitoring interval, using a monitoring time shown in the monitoring interval information. The event monitoring unit 61 monitors each event in the monitoring interval. With this arrangement, occurrence of high-priority events (events of which prompt and accurate notification is required) can be notified promptly and accurately to all Subscribe-registered clients. The monitoring cycle shown in the monitoring interval information in FIG. 15B is determined based on time required to carry out the monitoring-result notification process to one client. While two kinds of monitoring intervals are shown in FIG. 15B, three or more kinds of monitoring intervals can be also set.

Referring back to FIG. 14, when no event occurs, the event detector 32 notifies this fact to the event managing unit 43, upon enquiry from the event monitoring unit 61 of the event managing unit 43 (step S32). When an event has occurred, the event detector 32 notifies this fact to the event managing unit 43 (step S34).

Upon receiving the notification of the occurrence of an event from the event detector 32, the event managing unit 43 notifies this fact to the WS-Eventing processor 42 (step S35). The WS-Eventing processor 42 requests the SOAP/XML processor 23 to generate a message to notify the client about the occurrence of the event (step S36). The WS-Eventing processor 42 receives the message from the SOAP/XML processor 23 (step S37), and further delivers the message received from the SOAP/XML processor 23, to the HTTP controller 45 (step S38). The event notifying unit 52 of the HTTP controller 45 receives the message (the StatusEventReport message as shown in FIG. 10) from the WS-Eventing processor 42, and transmits the received message to the client (step S39). In FIG. 14, the StatusEventReport message is expressed as a Notification message. Usually, the client transmits a response message (an HTTP 200 Response in the example shown in FIG. 14) in response to the received message (step S40). At the above step S39, the event notifying unit 52 of the image processing device 1 transmits a message indicating the occurred events, to all clients who have received the event notification request (clients who have received the Subscribe message or the Renew message and for whom the validity period shown in the response message to the received message has not yet expired).

Figure 16:
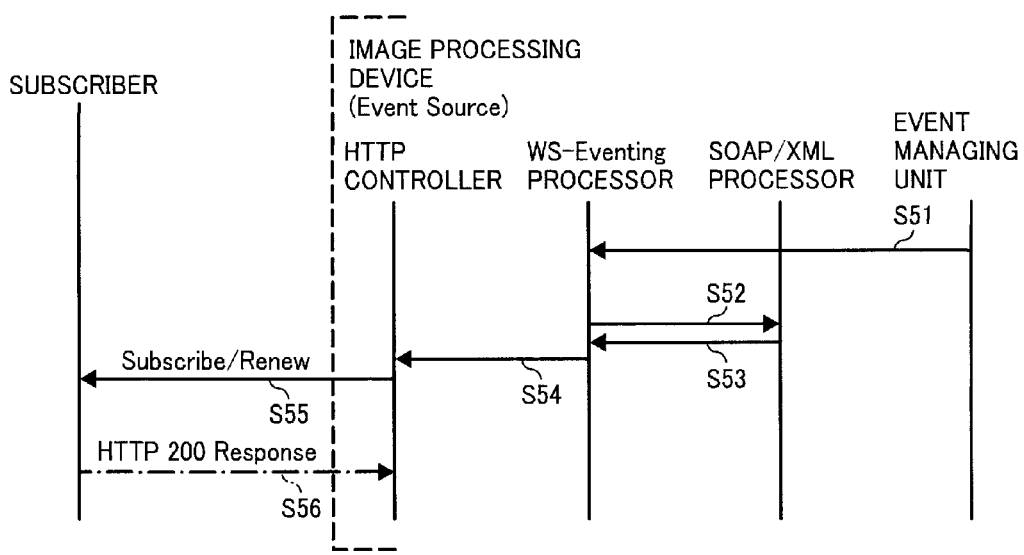
FIG. 16 is an example of a sequence that the image processing device shown in FIG. 1 transmits a SubscriptionEnd message.

FIG. 16 is an example of a sequence when the image processing device 1 transmits the SubscriptionEnd message. When an event corresponding to the SubscriptionEnd occurs, the event managing unit 43 notifies this fact to the WS-Eventing processor 42 (step S51). The WS-Eventing processor 42 requests the SOAP/XML processor 23 to generate a message to notify the client about the SubscriptionEnd (step S52), and receives a message in response to this request, from the SOAP/XML processor 23 (step S53). Further, the WS-Eventing processor 42 delivers the message received from the SOAP/XML processor 23 to the HTTP controller 45 (step S54). The HTTP controller 45 receives the message (the SubscriptionEnd message as shown in FIG. 9) from the WS-Eventing processor 42, and transmits the received message to the client (step S55). Usually, the client transmits a response message to the HTTP controller in response to the received message (step S56).

Figure 17:
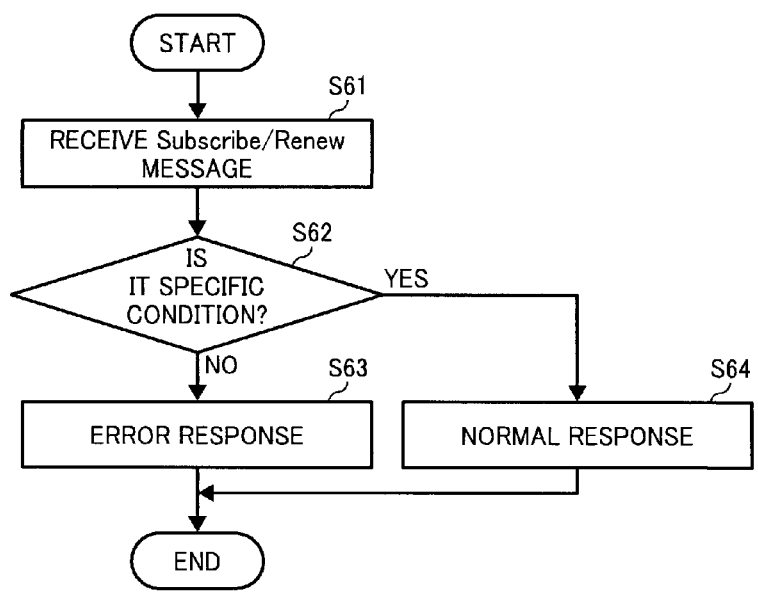
FIG. 17 is a flowchart of an example of an operation when the image processing device shown in FIG. 1 receives a Subscribe message and a Renew message.

FIG. 17 is a flowchart of an example of the operations performed by the image processing device 1 when the image processing device 1 has received the Subscribe message or the Renew message. Upon receiving the Subscribe message or the Renew message (step S61), the event managing unit 43 of the image processing device 1 confirms the content, and confirms whether the content corresponds to a specific condition (step S62). The event managing unit 43 determines whether the content corresponds to the specific condition, based on the transmitter of the Subscribe message or the Renew message (the client) or a type of the event to be monitored.

That is, when the Subscribe message or the Renew message is received, the adding unit 62 does not always add a record to the event management information 71, but determines whether the event name included in the Subscribe message or the Renew message and the client of the transmitter of the Subscribe message or the Renew message are to be added to the event management information 71, by relating the event name and the client to each other, based on the event name included in the Subscribe message or the Renew message or the client who transmits the Subscribe message or the Renew message, and the information stored in the event management information 71 (for example, the event and the client of the notification destination). For example, a priority is set to the event and the client, and the adding unit 62 determines the addition based on the priority.

FIGS. 18A and 18B depict example of the contents of the priority information 73 in a tabular form. The priority information 73 as shown in FIG. 18A is prepared in advance, and is held in the storage unit 16. A determination is carried out using the held table. For example, when a message is received from the transmitter of an IP address of high priority, this is determined as a specific condition. FIG. 18A is one example of contents of the priority information 73 that holds a relationship between the IP address of the transmitter of the Subscribe message or the Renew message and the priority.

That is, when the request receiving unit 51 receives the Subscribe message, the adding unit 62 of the event managing unit 43 calculates a number of records of the event names included in the Subscribe message stored in the field "event" of the event management information 71. The adding unit 62 determines whether the calculated number of records is a predetermined number (for example, 100). When the adding unit 62 determines that the number of records coincides with the predetermined number, the adding unit 62 determines whether the client of the transmitter of the Subscribe message is the client to be prioritized in the priority information 73. When the client has high priority in the priority information 73 for example, the adding unit 62 determines this client to be prioritized. When the adding unit 62 determines the client to be prioritized, the adding unit 62 deletes the record of other clients who are determined to be not prioritized in the event management information 71 (for example, clients who are set with low priority in the priority information 73), and adds the record of the client of the transmitter of the Subscribe message who is set as the client of the notification destination.

As a modification of the first embodiment, when the content of the received message corresponds to the item having high priority, this can be determined as a specific condition. FIG. 18B is one example of the contents of the priority information that holds a relationship between an event to be notified and priority. After receiving the Subscribe message, when the number of records of the event management information 71 becomes equal to or more than a predetermined number, the record of events having low priority is deleted, and the record of event having high priority is added.

In the confirmation process of a specific condition, only one piece of the information in FIGS. 18A and 18B or both can be used to determine whether a certain condition corresponds to a specific condition. These pieces of information have a possibility of difference depending on a kind of device of the transmitter of a message (Subscribe or Renew) or a specification and a type of the image processing device.

Referring back to FIG. 17, when the content is determined not to correspond to a specific condition at step S62 (NO at step S62), the image processing device 1 transmits an error response (the fault message as shown in FIG. 11A or 11B) (step S63). On the other hand, when content corresponds to a specific condition (YES at step S62), the image processing device 1 transmits a normal response (the SubscribeResponse message shown in FIG. 6 or the RenewResponse message shown in FIG. 8) (step S64). The detailed operation at steps S63 and S64 is as described above.

In a process procedure shown in FIG. 17, while the addition to the event management information 71 is determined depending on whether the content corresponds to a specific condition, the number of records held in the event management information 71 can be also taken into consideration. A modification that takes the specific condition and the number of records into consideration is explained below.

Figure 19:
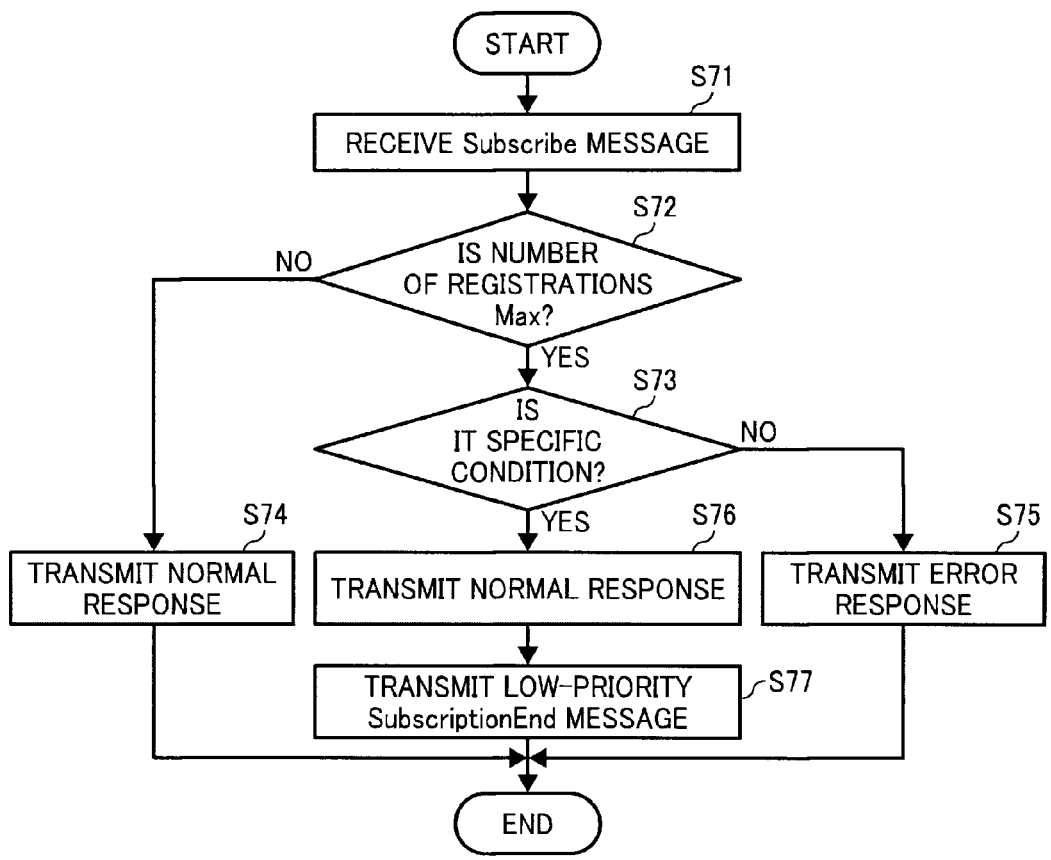
FIG. 19 is a flowchart of an operation example when the image processing device shown in FIG. 1 receives a Subscribe message.

FIG. 19 is a flowchart of an example of the operation when the image processing device 1 receives the Subscribe message according to the modification. When the request receiving unit 51 receives the Subscribe message (step S71), the adding unit 62 of the event managing unit 43 of the image processing device 1 confirms whether the number of Subscribe-registered clients reaches a maximum registerable number (step S72). As explained in the Subscribe message shown in FIG. 5, each client can individually assign an event to be subscribed. Therefore, there is a possibility of coexistence of events of which number of subscription registration by clients has not reached a maximum registerable number and others. Therefore, at step S72, it is confirmed whether the number of Subscribe-registered clients has reached a maximum registerable number, for each event shown in the Subscribe message. As a result of the process at step S72, when the adding unit 62 determines that the number of Subscribe-registered clients has not reached the maximum registerable number (NO at step S72), the HTTP controller 45 transmits the normal response (the SubscribeResponse message shown in FIG. 6) (step S74). On the other hand, when the adding unit 62 determines that there is at least one event of which subscription number of Subscribe-registered clients has reached the maximum number (YES at step S72), the adding unit 62 confirms the content of the received Subscribe message, and confirms whether the content corresponds to a specific condition (step S73). The confirmation process of determining whether the content corresponds to a specific condition is the same as that at step S62 shown in FIG. 16. When the adding unit 62 determines that the content does not correspond to the specific condition at step S73 (NO at step S73), the HTTP controller 45 of the image processing device 1 transmits the error response (the fault message as shown in FIG. 11A) (step S75). On the other hand, when the adding unit 62 determines that the content corresponds to the specific condition at step S73 (YES at step S73), the HTTP controller 45 of the image processing device 1 transmits the normal response (the SubscribeResponse message as shown in FIG. 6) (step S76).

When the request receiving unit 51 receives the Subscribe message from a client of high priority, the adding unit 62 selects low-priority Subscribe-registered clients, deletes their registrations, and the HTTP controller 45 transmits the low-priority SubscriptionEnd message to these clients (step S77). That is, the adding unit 62 registers as new information the content of the Subscribe message received at step S71 in place of the selected registered information, regarding the event of which the number of Subscribe-registered clients reaches the maximum registerable number. The maximum registerable number can be different depending on a type of the event of which subscription is registered (the event registered to be monitored).

Upon receiving the Subscribe message requesting a monitoring of a high-priority event, the adding agent selects low-priority clients from among Subscribe-registered clients of events of which the number of Subscribe-registered clients reaches the maximum registerable number, and registers clients of transmitters of the Subscribe message received at step S71 as new subscribers in place of the selected clients.

Figure 20:
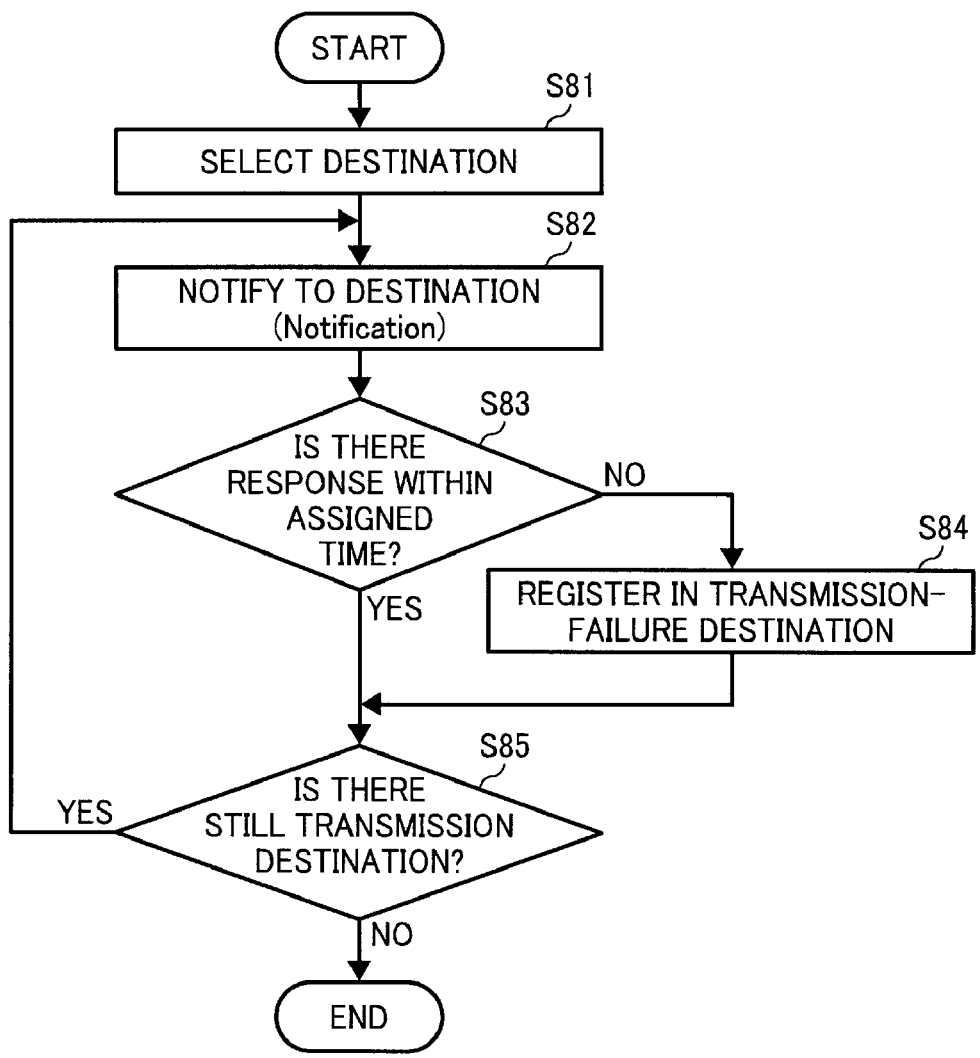
FIG. 20 is a flowchart of an operation example when an event occurs in the image processing device shown in FIG. 1.

FIG. 20 is a flowchart of an example of the operation when an event occurs in the image processing device 1. Upon detecting the occurrence of an event, the event managing unit 43 selects a client of a message destination to whom the event is to be notified from among the Subscribe-registered clients (step S81). The event notifying unit 52 transmits the message (the event notification message) to notify the content of the event that occurs by executing the process at steps S36 to S39 shown in FIG. 14, to the destination (the client) selected at step S81 (step S82). The event notifying unit 52 confirms whether a response has been transmitted from the message destination within the assigned time (step S83). When there is no response within the assigned time (NO at step S83), the event notifying unit 52 registers the destination of the message transmitted at step S82 into a transmission-failure destination (step S84). In this case, the event notifying unit 52 deletes this event information from the event managing unit, according to need. A method of setting the assigned time is described later.

On the other hand, when there is a response within an assigned time (YES at step S83), the event notifying unit 52 confirms whether there still remains a transmission destination of the event notification message (whether the event notification message has been transmitted to all Subscribe-registered clients) (step S85). When it is confirmed that there remains no transmission destination (the event notification message has been transmitted to all Subscribe-registered clients) (NO at step S85), the process ends. When the event notifying unit 52 confirms that there remains a transmission destination (YES at step S85), the process returns to step S81, and the event notifying unit 52 continues the above process at steps S81 to S85.

Figures 21, 22:
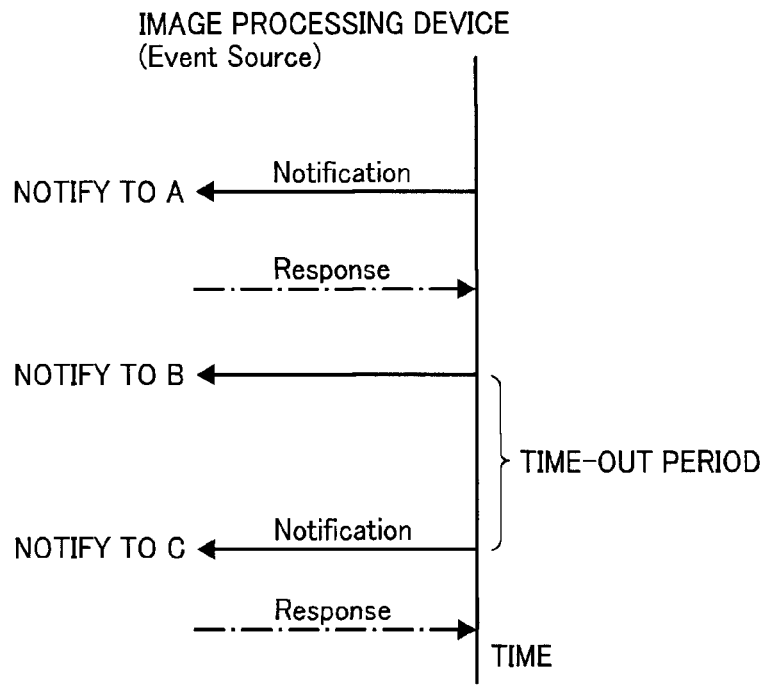
FIG. 21 depicts in time series an example of an operation when an event occurs in the image processing device shown in FIG. 1.
FIG. 22 depicts an example of contents of information that the image processing device uses shown in FIG. 1 in the event notification operation.

FIG. 21 depicts in time series an example of the operation when the above event occurs in the image processing device 1. In the above process at step S83, the time for waiting for a response from the message destination (corresponding to the above assigned time) is changed based on the number of subscribe registrations (the number of Subscribe-registered clients). For example, the table as shown in FIG. 22 is prepared and is held in the storage unit 16 in advance. When the number of subscribe registrations is equal to or less than 100, the response waiting time is set to 4 seconds. Accordingly, the event notification process to all Subscribe-registered clients can be finished within the specific time. The response waiting time shown in FIG. 22 is determined based on time necessary for the monitoring-result notification process to one client.

As described above, according to the first embodiment, the event detection interval is changed according to the number of clients (the number of Subscribe-registered clients) that are the destinations of notification of occurrence of an event (the event notification destinations). As a result, the latest information about the event can be correctly notified to all event notification destinations.

Priority is set depending on a kind of the accepted event monitoring request (the Subscribe message), and the event detection interval is changed. Therefore, when the event occurrence is detected, the occurred event can be correctly and efficiently notified to all event-notification destinations.

Whether a new event-monitoring request or an update event-monitoring request (a Renew message) is to be processed is determined, based on the number of Subscribe-registered clients, that is, based on whether the number of Subscribe-registered clients reaches the maximum registerable number. Therefore, the occurred event can be securely notified to once-registered event notification destinations.

Even when the number of Subscribe-registered clients reaches the maximum registerable number, when the event monitoring request from a specific client having high priority (priority client) is accepted, registration of other Subscribe-registered clients having low priority is deleted, and the priority client is Subscribe-registered. Therefore, the occurred event can be securely notified to the client having high priority.

Even when the number of Subscribe-registered clients reaches the maximum registerable number, when a specific type of the event monitoring request having high priority is accepted, registration of other Subscribe-registered clients having low priority is deleted. Therefore, the occurred event of high priority can be securely notified.

The response waiting time from the event notification destination in response to the event notification can be changed according to the number of Subscribe-registered clients. Therefore, the event can be notified to as many event notification destinations as possible.

While the image processing device 1 that notifies an event is explained in the first embodiment, the present invention can be applied to various kinds of device in addition to the image processing device. For example, the invention can be also applied to business office devices connected to various devices via corporate networks. That is, the invention can be applied to devices that are connected to client devices via the network and that can communicate when the monitored state changes.

In the image processing device 1, the monitoring interval is set corresponding to the number of monitoring events. Therefore, when the number of monitoring events increases, the processing load can be decreased by setting a long monitoring interval.

The image processing device 1 sets the monitoring cycle as setting information of monitoring control to monitor events. However, the setting information of monitoring control is not limited to the monitoring cycle. In a second embodiment of the present invention, the setting of a validity period to carry out the event notification is explained as the setting information of monitoring control.

The image processing device 101 according to the second embodiment is different from the image processing device 1 in that the image processing device 101 includes a network controller 2601 having a different configuration that carries out a process different from that of the network controller 27. In the following explanations, constituent elements of the second embodiment that are identical to those of the first embodiment are denoted by like reference numerals, and explanations thereof will be omitted.

Figure 23:
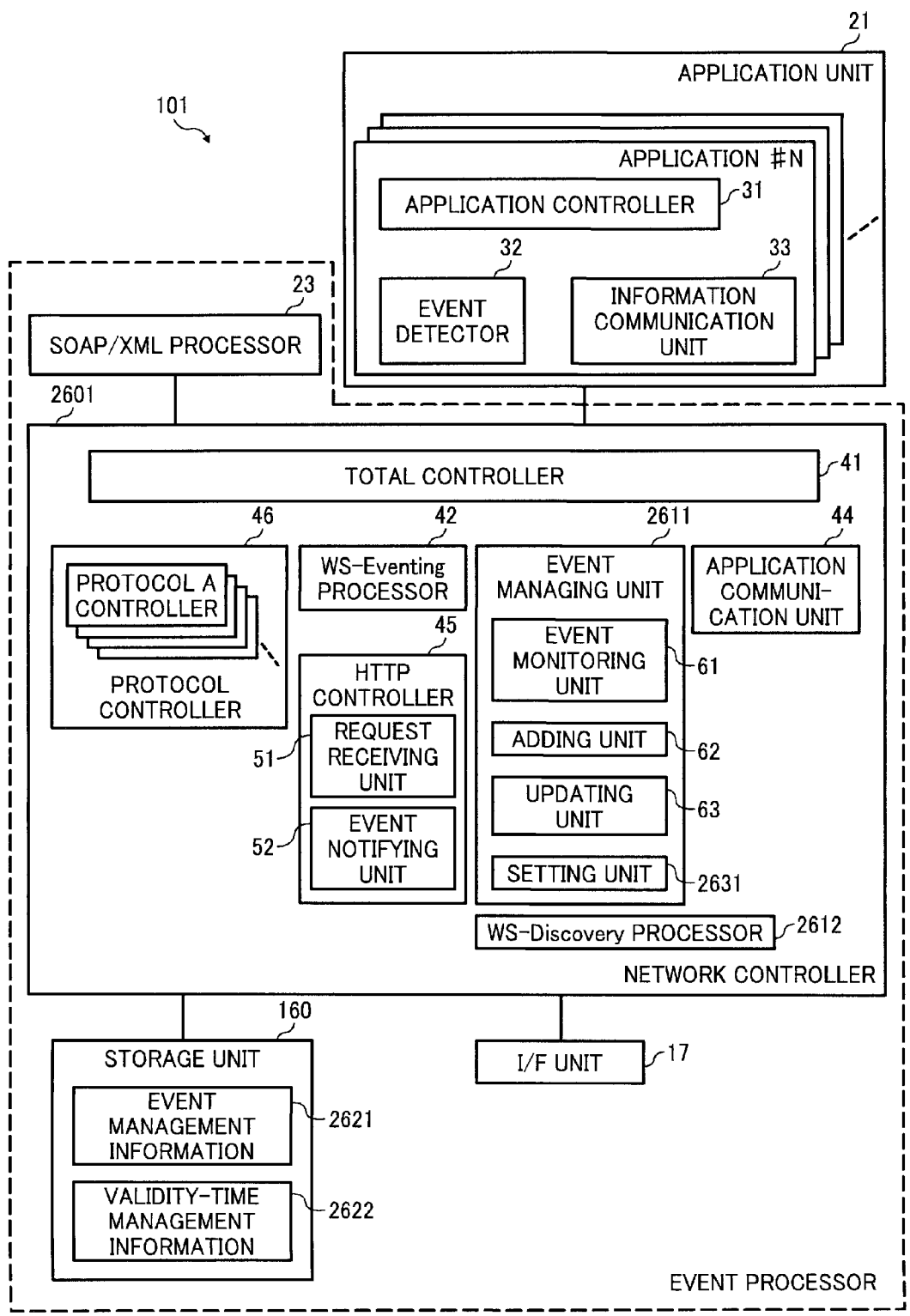
FIG. 23 is a configuration example of an event notifying unit and an application unit of an image processing device according to a second embodiment of the present invention.

FIG. 23 is a configuration example of the event processor and the application unit 21 of the image processing device 101. The event processor according to the second embodiment includes a storage unit 160, the network controller 2601, the SOAP/XML processor 23, and the I/F unit 17.

The storage unit 160 stores event management information 2621 and validity-time management information 2622.

FIG. 24 depicts exemplary contents of the event management information 2621 in tabular form. As shown in FIG. 24, the event management information 2621 includes management number, destination notification client, event type, subscribe ID, validity time, and registration time. The record of the event management information 2621 is registered corresponding to the event notification request from the client. When an event occurs, the image processing device 1 refers to the event management information 2621, and notifies the event to the notification destination client.

The management number is a sequential number indicating each record. The subscribe ID is a unique ID allocated to each Subscribe message. The registration time holds time when the record is registered or updated. After a validity time expires since the registration time, the corresponding record is deleted. A detailed process is described later.

FIG. 25 depicts a structure of the validity-time management information 2622. As shown in FIG. 25, the validity-time management information 2622 stores the number of monitoring events and a validity time, by relating these items to each other. The image processing device 101 sets the validity time of the event management information 2621, using the validity-time management information 2622.

The validity-time management information 2622 can be stored in an NVRAM of the storage unit 160. The validity-time management information 2622 does not need to be a rewritable storage unit, and hard coding on software to carry out the process is considered.

The image processing device 101 refers to the validity-time management information 2622, and sets a validity time suitable to register or update the record in the event management information 2621.

Referring back to FIG. 23, the network controller 2601 is different from the network controller 27 according to the first embodiment in that the event managing unit 43 is replaced with an event managing unit 2611 that carries out a different process from that of the event managing unit 43, and that a WS-Discovery processor 2612 is newly added to the network controller 2601.

The WS-Discovery processor 2612 processes the WS-Discovery protocol. A packet defined by the WS-Discovery protocol includes a network withdrawn packet Bye.

That is, the image processing device 101 processes the packet defined in the WS-Discovery protocol such as the Bye packet, in addition to messages of the WS-Eventing protocol such as the Subscribe message processed by the image processing device 1.

FIG. 26 is one example of the Subscribe message in the WS-Eventing protocol. The client transmits this Subscribe message to the image processing device 101 to request notification of an event. The Subscribe message shown in FIG. 26 can be specified as the Subscribe message in a row 3001. In a row 3002, a validity time is described. In a row 3003, the event "PrinterStatusEvent" is requested to be registered as an event to be monitored. The event "PrinterStatusEvent" occurs when the "PrinterStatus" of the image processing device 101 has changed. That is, when the "PrinterStatus" of the image processing device 101 has changed, an event is notified to the client.

FIG. 27 is one example of a SubscribeResponse message according to the second embodiment. The message can be specified as the SubscribeResponse message in a row 3101. "PT30M" encircled by the Expires tag in a row 3102 indicates that 30 minutes is set as the validity time of the monitoring of this event.

The SubscribeResponse message shown in FIG. 27 is a first example of a response message of the Subscribe message shown in FIG. 26. The image processing device 101 transmits the SubscribeResponse message to the client who notified the Subscribe message shown in FIG. 26. Specifically, in response to the request of 30 minutes as the validity time in the Subscribe message shown in FIG. 26, the setting of 30 minutes as the validity time as requested is responded in the SubscribeResponse message shown in FIG. 27.

The SubscribeResponse message shown in FIG. 28 is a second example of a response message of the Subscribe message shown in FIG. 26. The response message can be specified as the SubscribeResponse message in a row 3201. "TP10M" encircled by the Expires tag in a row 3202 indicates that 10 minutes is set as the validity time of monitoring the event. Specifically, in response to the request of 30 minutes as the validity time in the Subscribe message shown in FIG. 26, the setting of 10 minutes, shorter than the requested time, as the validity time is responded in the SubscribeResponse message shown in FIG. 28.

As explained above, when there is a request for event notification from the client, the image processing device 101 suitably sets the validity time of the request according to the state. States of setting the validity time are considered to include the number of events, the event monitoring destination, and types of events. In the second embodiment, change of the validity time based on the number of events is explained.

Referring back to FIG. 23, the event managing unit 2611 includes the event monitoring unit 61, the adding unit 62, the updating unit 63, and a setting unit 2631.

The setting unit 2631 sets the validity time to monitor each event, based on the number of events stored in the event management information 2621.

Figures 29, 30A, 30B:
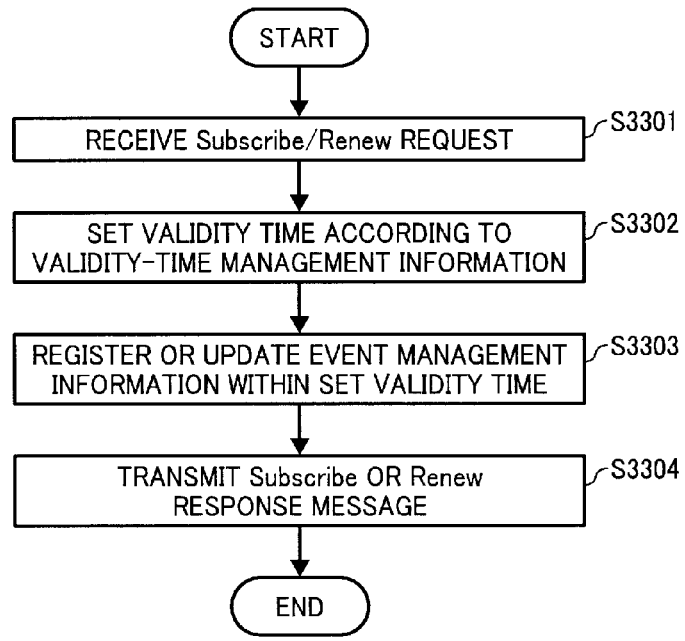
FIG. 29 is a flowchart of a process procedure when the image processing device according to the second embodiment receives a message.
FIGS. 30A and 30B depict example of contents of validity-time management information according to a modification of the second embodiment.

Reception of a message in the image processing device 101 is explained next. FIG. 29 is a flowchart of a process procedure of the image processing device 101.

The request receiving unit 51 receives the Subscribe request or the Renew request from the client (step S3301).

The setting unit 2631 refers to the validity-time management information 2622, and sets the validity time (step S3302). In the second embodiment, the setting unit 2631 calculates a sum of the number of received requests and the number of records of which validity period has not expired in the event management information 2622, as the number of events to be monitored, and sets the validity time by referencing the calculated number of events and the validity-time management information 2622.

When the number of monitoring events is between 1 and 50, the setting unit 2631 sets the validity time requested in the Subscribe message or the Renew message as the actual validity time. When the number of monitoring events is between 51 and 100, the setting unit 2631 sets the validity time to 30 minutes. When the number of monitoring events is between 101 and 200, the setting unit 2631 sets the validity time to 20 minutes. When the number of monitoring events is more than 200, the setting unit 2631 sets the validity time to 10 minutes. When the validity time is not requested in the Subscribe message or the Renew message, the setting unit 2631 sets the validity time to 10 minutes.

When the validity time expires, each record set in this way is deleted from the event management information 2621. However, when the Renew request is received from the client before the expiration of the validity time, the record is not deleted, and a new validity time is set. When the number of monitoring events has changed at the time of setting the validity time, a new validity time is set following the latest number. As explained above, a validity time different from that of the last Subscribe request or the last Renew request is set depending on the situation.

That is, the setting unit 2631 refers to the event management information 2621, and sets the validity time as requested by the client, when the number of monitoring events is within the range of one to fifty. When the number of monitoring events is larger than fifty, a shorter validity time is set along the increase in the number of monitoring events. With this arrangement, the monitoring load of the image processing device 101 can be decreased.

The setting unit 2631 registers or updates the set validity time in the event management information 2621, by relating the validity time to the information concerning the events of which monitoring is requested by the client (step S3303). The setting unit 2631 can register the record when the Subscribe request is received, and can update the record when the Renew request is received. In the second embodiment, while the setting unit 2631 sets the validity time to only the newly-registered or updated record, the setting unit 2631 can also reset the validity time to all records in the event management information 2621.

The setting unit 2631 transmits the Subscribe or the Renew response message to the client who transmits the Subscribe request or the Renew request (step S3304).

Based on the above process procedure, the setting unit 2631 can set a suitable validity time corresponding to the number of monitoring events, when receiving the Subscribe request or the Renew request.

The validity time can be also set according to a type of the event and a client of the request transmitter, as an alternative method of the second embodiment. The setting of a validity time according to a type of the event is explained below as modifications. FIGS. 30A and 30B depict contents of validity-time management information according to a first modification. As shown in FIG. 30A, a type of the event and a validity time are related to each other in the validity-time management information. Based on this, at step S3302 in FIG. 29, the setting unit refers to the validity-time management information, and sets the validity time related to the type of the event of which monitoring is requested in the Subscribe request or the Renew request. In the validity-time management information according to the present modification, a long validity time is set to an important type of the event. Accordingly, a possibility that the important event is notified to the client is improved. Other processes are similar to those of the first embodiment.

The setting of a validity time to a client of a request transmitter is explained as another modification. FIG. 30B depicts validity-time management information according to a second modification. As shown in FIG. 30B, an IP address that identifies a client and a validity time are related to each other in the validity-time management information. In the validity-time management information according to the present modification, a long validity time is set to an important type of the event. Further, in the validity-time management information according to the present modification, a long validity time is set to a client. Based on this, at step S3302 in FIG. 29, the setting unit refers to the validity-time management information, and sets the validity time corresponding to the client who requests monitoring in the Subscribe request or the Renew request. In the validity-time management information according to the present modification, a long validity time is set to an important client. Other processes are similar to those of the first embodiment.

As described in the above modifications, a suitable validity-time management information can be used according to the environment of the user. It can be set such that all validity-time management information explained in the above embodiments and modifications can be stored in advance in the image processing device, and a manager can use a suitable validity-time management information. This can be set to the network controller from an operation panel provided in the image processing device, or can be set from the outside through the network controller.

The time when the image processing device 101 can delete a record from the event management information 2621 is not limited to the time after the expiration of the validity period. For example, the image processing device 101 can also delete the record from the event management information 2621, when the client leaves the network.

Figure 31:
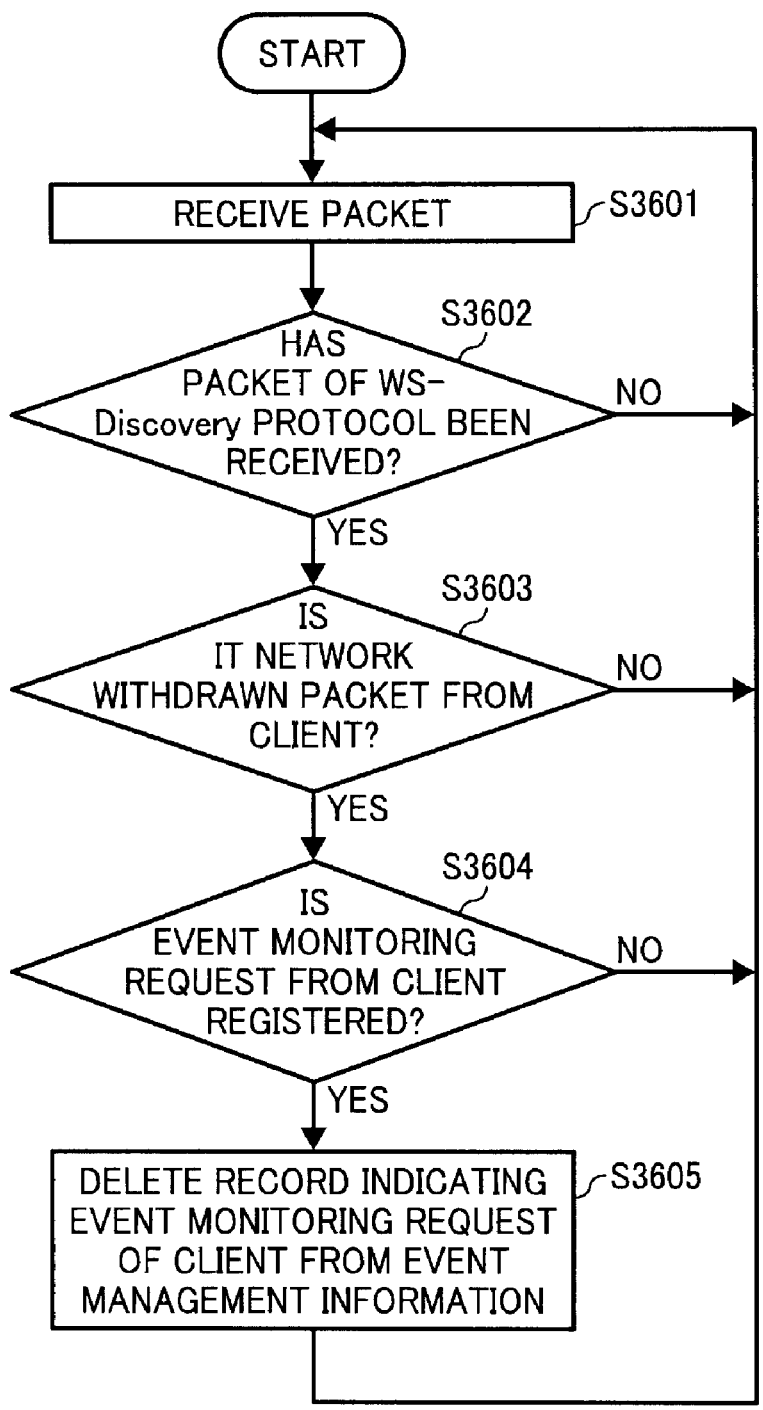
FIG. 31 is a flowchart of a procedure performed by a network withdrawn packet in the image processing device according to the second embodiment.
Figure 34A:
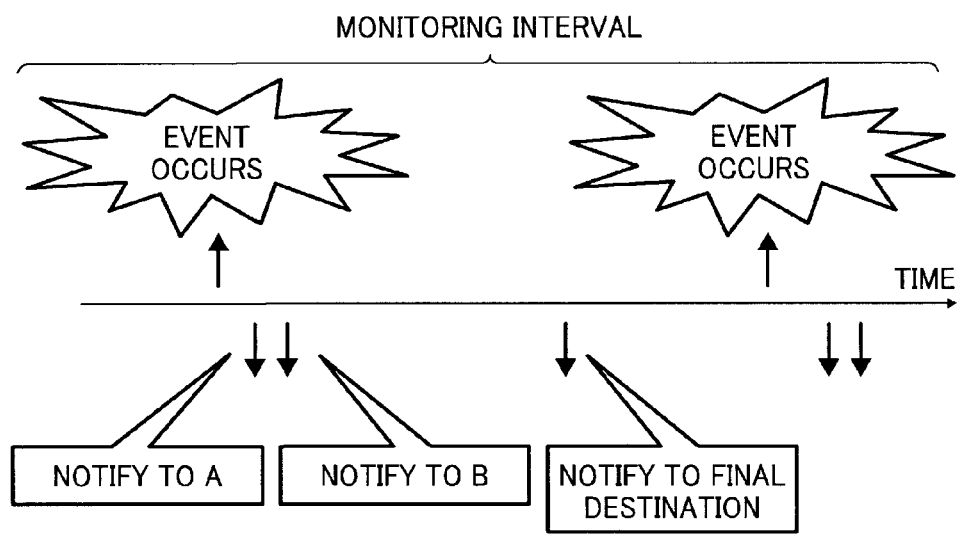
FIGS. 34A and 34B depict a problem to be solved by the present invention.
Figure 34B:
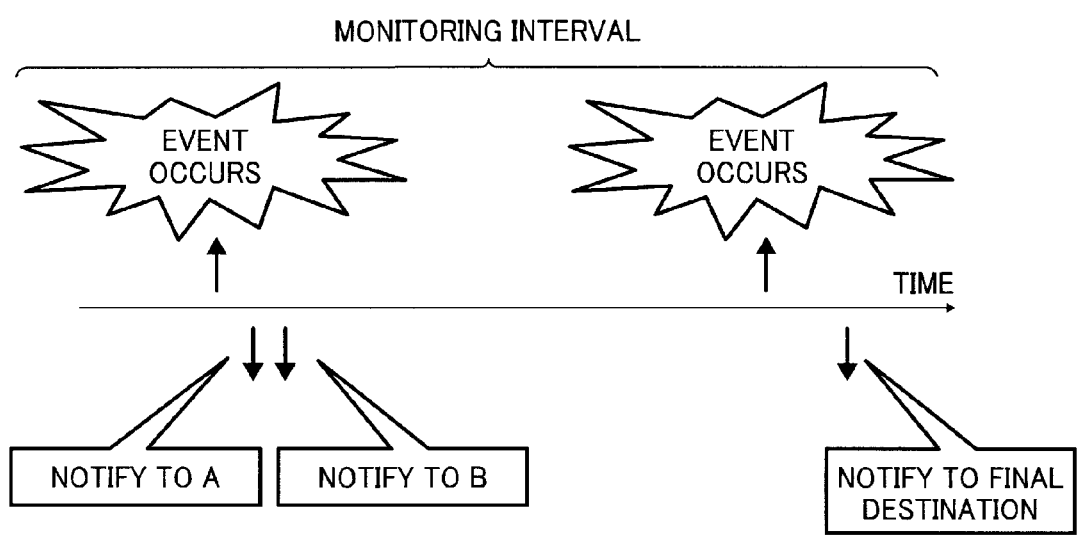

A network-withdrawn-packet receiving process of the image processing device 101 is explained next. FIG. 31 is a flowchart of a procedure of a network withdrawn packet in the image processing device 101.

First, the HTTP controller 45 of the image processing device 101 receives a packet via the I/F unit 17 (step S3601).

The HTTP controller 45 determines whether the HTTP controller 45 has received a packet of the WS-Discovery protocol (step S3602). When the HTTP controller 45 has received a packet other than the packet of the WS-Discovery protocol (NO at step S3602), a constituent unit other than the WS-Discovery processor 2612 processes, and the HTTP controller 45 starts receiving a packet again (step S3601).

When the HTTP controller 45 has received a packet of the WS-Discovery protocol (YES at step S3602), the WS-Discovery processor 2612 determines whether the packet is a network withdrawn packet from the client (step S3603). When the WS-Discovery processor 2612 determines that the packet is not a network withdrawn packet (NO at step S3603), the HTTP controller 45 carries out a suitable process according to the determined packet, and starts receiving a packet again (step S3601).

FIG. 32 is one example of a network withdrawn packet. When a row 3701 in FIG. 32 is confirmed, the packet can be determined as a network withdrawn packet, because "Bye" is described.

Referring back to FIG. 31, when the WS-Discovery processor 2612 determines that the packet is a network withdrawn packet (YES at step S3603), the WS-Discovery processor 2612 notifies this fact to the event managing unit 2611 together with the IP address indicating the client who has left the network.

The event managing unit 2611 determines whether a record having the notified IP address as the notification destination client is present in the event management information 2621 (step S3604). When the event managing unit 2611 determines that a record having the notified IP address as the notification destination client is not present in the event management information 2621 (NO at step S3604), the HTTP controller 45 does not carry out a process, and starts receiving a packet again (step S3601).

When the event managing unit 2611 determines that a record having the notified IP address as the notification destination client is present in the event management information 2621 (YES at step S3604), the event managing unit deletes the record from the event management information 2621 (step S3605). As a result, the event monitoring request is deleted from the client who left the network. Thereafter, a reception of a packet is started again (step S3601).

Based on the above processing, the event notification request from the client who left the network is deleted.

That the image processing device 101 receives a network withdrawn packet is explained next. FIG. 33 is a sequence diagram that the image processing device 101 receives a network withdrawn packet.

First, the HTTP controller 45 receives a network withdrawn packet (Bye) from the client (the subscriber) (step S3801).

The network withdrawn packet is described in the WS-Discovery protocol. Therefore, the HTTP controller 45 notifies the packet received in the WS-discovery processor 2612 (step S3802).

The WS-Discovery processor 2612 delivers the packet received from the HTTP controller 45 to the SOAP/XML processor 23 (step S3830). The SOAP/XML processor 23 analyses the content of the message received at step S3803, and transmits a result of the analysis to the WS-Discovery processor 2612 (step S3804).

The WS-Discovery processor 2612 recognizes that a predetermined client has left the network, from the received result of the analysis, and notifies the event managing unit 2611 that the client has left the network (step S3805). As a result, the record storing the event monitored at the request of the client who left the network can be deleted from the event management information 2621.

The image processing device 101 changes, depending on the state, the validity time of notifying the event to the client who made the request. Therefore, the processing load of the image processing device 101 can be decreased.

The validity time is managed based on the validity-time management information 2622, and the validity time is changed according to the received request. With this arrangement, the image processing device 101 can have degree of freedom. Because the user can change data stored in the validity-time management information 2622, customization can be improved.

The event notification program executed by the image processing device 1 or 101 can be stored in a computer connected to a network such as the Internet. Such a computer program can be provided by downloading from the network. The event notification program executed by the image processing device 1 or 101 can be also provided or distributed via a network such as the Internet.

The event notification program of the image processing device 1 or 101 can be also provided by being stored in the ROM beforehand.

The event notification program executed by the image processing device 1 or 101 according to the above-described embodiments has a module including the units described above (the system controller 24, the memory controller 25, the distribution controller 26, the network controller 27, and the OS/Kernel 28). As actual hardware, the CPU reads the event notification program from the recording medium, and executes this program to load each unit to the main storage device, thereby generating the system controller 24, the memory controller 25, the distribution controller 26, the network controller 27, and the OS/Kernel 28, in the main storage device.

According to an aspect of the present invention, setting information to be used for a predetermined monitoring control is set, and the predetermined monitoring control is carried out using this setting information. With this arrangement, a proper monitoring can be carried out according to a situation, and the processing load can be decreased.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An event notification device connected to a plurality of client devices via a network, the event notification device comprising:
   a receiving unit that receives from at least a first client device from among the client devices a request message containing a request for monitoring a first event from among a plurality of events in the event notification device;
   an adding unit that adds information about the first client device as destination client information and information about the first event as monitoring-target event information to a storage unit;
   a setting unit that sets setting information to be used when monitoring events occurring in the event notification device based on at least one of the destination client information and the monitoring-target event information stored in the storage unit;
   an event monitoring unit that monitors events, including the first event, occurring in the event notification device based on the setting information; and
   an event notifying unit that notifies, when the event monitoring unit detects occurrence of the first event, to the first client device based on the destination client information and the monitoring-target event information stored in the storage unit.

2. The event notification device according to claim 1, wherein the setting information includes a monitoring cycle indicative of a cycle of monitoring the events.

3. The event notification device according to claim 2, wherein the setting unit
   determines a number of client devices associated with each of the events based on the destination client information and the monitoring-target event information stored in the storage unit, and
   sets a longer monitoring cycle for a second event than a third event from among the events if the determined number of client devices associated with the second event is greater than that for the third event.

4. The event notification device according to claim 2, wherein the adding unit determines whether to add to the storage unit the information about the first client device and information about the first event included in the request message based on the destination client information and the monitoring-target information previously stored in the storage unit.

5. The event notification device according to claim 4, wherein the adding unit
   determines whether a number of client devices associated with the first event included in the request message in the storage unit coincides with a predetermined number, and
   does not add the information about the first client device and information about the first event to the storage unit when the number of client devices associated with the first event included in the request message in the storage unit coincides with a predetermined number.

6. The event notification device according to claim 2, wherein
   the storage unit stores therein priority client information indicating a client device to which event notification is prioritized, and
   the adding unit
   determines a number of client devices associated with each of the events based on the destination client information and the monitoring-target event information stored in the storage unit,
   determines whether the number of client devices associated with the first event included in the request message in the storage unit coincides with a predetermined number,
   determines whether the first client device has been prioritized based on the priority client information when the number of client devices associated with the first event included in the request message in the storage unit coincides with a predetermined number, and
   deletes information regarding another client device and corresponding information about an event from the storage unit, and adds the information about the first client device and information about the first event to the storage unit.

7. The event notification device according to claim 2, wherein
   after notifying the occurrence of the first event to the first client device, the event notifying unit monitors whether a response message is received from the first client device, and
   when the response message is received, or when assigned time determined based on the number of destination clients related to the occurred event has passed, the event notifying unit notifies the first event to the client device which is the notification destination of the first event and to which the first event has not yet been notified, and thereafter, the event notifying unit continues the notification process until when the first event is notified to all client devices of the event notification destinations.

8. The event notification device according to claim 1, wherein
the storage unit stores therein validity time indicating a time interval of notifying the first event to the client devices,
the setting unit sets the validity time as the setting information.

9. The event notification device according to claim 8, wherein the setting unit sets the validity time based on a number of the client devices in the destination client information stored in the storage unit.

10. The event notification device according to claim 8, wherein
the storage unit stores therein information about the client device, and priority of the client device to which the event notification is to be prioritized, and
the setting unit sets the validity time based on the priority related, by the storage unit, to the client device indicated by the destination client information added to the storage unit.

11. The event notification device according to claim 8, wherein
the storage unit that stores therein information about the first event, and event validity time indicating a time interval of notifying each of the first event,
the setting unit sets the event validity time to the destination client information added to the storage unit, which is the validity time related to the added destination client information.

12. The event notification device according to claim 8, wherein
the receiving unit receives the request message to which the validity time is assigned, from each client device, and
when the validity time is assigned, the setting unit sets the assigned validity time of the received request message, and when the validity time is not assigned, the setting unit sets the validity time, based on the number of client devices in the destination client information added to the storage unit.

13. The event notification device according to claim 1, wherein the event notifying unit notifies the first event using a WS-Eventing protocol.

14. A method of notifying an event occurring on a source device to a plurality of client devices connected to the source device via a network, the method comprising:
receiving from at least a first client device from among the client devices a request message containing a request for monitoring a first event from among a plurality of events in the source device;
adding information about the first client device as destination client information and information about the first event as monitoring-target event information to a storage unit;
providing setting information to be used when monitoring events occurring in the event notification device based on at least one of the destination client information and the monitoring-target event information stored in the storage unit;
monitoring events, including the first event, occurring in the event notification device based on the setting information; and
notifying, when the event monitoring unit detects occurrence of the first event, to the first client device based on the destination client information and the monitoring-target event information stored in the storage unit.

15. The method according to claim 14, wherein the setting information includes a monitoring cycle indicative of a cycle of monitoring the events.

16. The method according to claim 14, further comprising storing in the storage unit validity time indicating a time interval of notifying the first event to the client devices, and setting the validity time as the setting information.

17. A computer program product that includes a computer-readable recording medium that stores therein a computer program that causes a computer to execute a method of notifying an event occurring on a source device to a plurality of client devices connected to the source device via a network, the computer program causing the computer to execute:
receiving from at least a first client device from among the client devices a request message containing a request for monitoring a first event from among a plurality of events in the source device;
adding information about the first client device as destination client information and information about the first event as monitoring-target event information to a storage unit;
providing setting information to be used when monitoring events occurring in the event notification device based on at least one of the destination client information and the monitoring-target event information stored in the storage unit;
monitoring events, including the first event, occurring in the event notification device based on the setting information; and
notifying, when the event monitoring unit detects occurrence of the first event, to the first client device based on the destination client information and the monitoring-target event information stored in the storage unit.

18. The computer program product according to claim 17, wherein the setting information includes a monitoring cycle indicative of a cycle of monitoring the events.

19. The computer program product according to claim 17, further comprising storing in the storage unit validity time indicating a time interval of notifying the first event to the client devices, and setting the validity time as the setting information.

* * * * *